United States Patent
Ganzi et al.

(10) Patent No.: US 10,625,211 B2
(45) Date of Patent: Apr. 21, 2020

(54) METHOD AND SYSTEM FOR WATER TREATMENT

(71) Applicant: EVOQUA WATER TECHNOLOGIES LLC, Pittsburgh, PA (US)

(72) Inventors: Gary C. Ganzi, Lexington, MA (US); Frederick C. Wilkins, Pepperell, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/179,593

(22) Filed: Nov. 2, 2018

(65) Prior Publication Data

US 2019/0070561 A1    Mar. 7, 2019

Related U.S. Application Data

(60) Division of application No. 15/681,577, filed on Aug. 21, 2017, which is a continuation-in-part of (Continued)

(51) Int. Cl.
*C02F 1/469*    (2006.01)
*B01D 61/58*    (2006.01)
(Continued)

(52) U.S. Cl.
CPC .............. *B01D 61/58* (2013.01); *A01G 25/00* (2013.01); *B01D 61/48* (2013.01); *C02F 1/008* (2013.01); *C02F 1/442* (2013.01); *C02F 1/469* (2013.01); *C02F 1/4693* (2013.01); *C02F 9/00* (2013.01); *B01D 61/027* (2013.01); *B01D 61/44* (2013.01);
(Continued)

(58) Field of Classification Search
CPC .............. B01D 61/42–54; B01D 61/58; B01D 61/027; B01D 61/002; B01D 2317/08; B01D 2311/06; B01D 2311/08; C02F 1/442; C02F 1/4693; C02F 1/4695
See application file for complete search history.

(56) References Cited

U.S. PATENT DOCUMENTS

| 2,514,415 A | 7/1950 | Rasch |
| 2,681,319 A | 6/1954 | Bodamer |

(Continued)

FOREIGN PATENT DOCUMENTS

| AU | 629790 A | 10/1992 |
| CA | 2316012 C | 4/2005 |

(Continued)

OTHER PUBLICATIONS

"Affordable Desalination Sets Low Energy Record," press release, http://www.affordableseal.com/home/news/ADC%20Sets%20Low%20Energy%20Record%205-8-06.pdf, May 4, 2006, printed on Apr. 16, 2008.

(Continued)

*Primary Examiner* — Steven A. Friday

(57) ABSTRACT

Water treatment systems including electrically-driven and pressure-driven separation apparatus configured to produce a first treated water suitable for use as irrigation water and a second treated water suitable for use as potable water from brackish or saline water and methods of operation of same.

12 Claims, 5 Drawing Sheets

Related U.S. Application Data application No. 13/599,871, filed on Aug. 30, 2012, which is a continuation-in-part of application No. 11/524,078, filed on Sep. 20, 2006, now Pat. No. 8,277,627.

(60) Provisional application No. 60/805,512, filed on Jun. 22, 2006, provisional application No. 60/804,610, filed on Jun. 13, 2006.

(51) Int. Cl.

| | | |
|---|---|---|
| *B01D 61/44* | (2006.01) | |
| *C02F 1/44* | (2006.01) | |
| *C02F 1/00* | (2006.01) | |
| *A01G 25/00* | (2006.01) | |
| *B01D 61/48* | (2006.01) | |
| *C02F 9/00* | (2006.01) | |
| *B01D 61/46* | (2006.01) | |
| *B01D 61/02* | (2006.01) | |
| *C02F 103/08* | (2006.01) | |

(52) U.S. Cl.
CPC ........ *B01D 61/46* (2013.01); *B01D 2311/246* (2013.01); *B01D 2311/2649* (2013.01); *B01D 2317/02* (2013.01); *B01D 2317/022* (2013.01); *B01D 2317/08* (2013.01); *C02F 1/441* (2013.01); *C02F 1/444* (2013.01); *C02F 1/4695* (2013.01); *C02F 2103/08* (2013.01); *C02F 2201/46115* (2013.01); *C02F 2209/05* (2013.01); *C02F 2301/08* (2013.01); *Y02A 20/131* (2018.01); *Y02A 20/134* (2018.01)

(56) References Cited

U.S. PATENT DOCUMENTS

| | | |
|---|---|---|
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,035,777 A | 5/1962 | Bodell et al. |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal |
| 3,165,460 A | 1/1965 | Zang |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,160,738 A | 7/1979 | Guter |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,806,244 A | 2/1989 | Guilhem |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,094,732 A | 3/1992 | Oldani et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,344,566 A | 9/1994 | Clancey |
| 5,346,624 A | 9/1994 | Libutti et al. |
| 5,346,924 A | 9/1994 | Giuffrida |

(56) References Cited

U.S. PATENT DOCUMENTS

| | | |
|---|---|---|
| 5,356,849 A | 10/1994 | Matviya et al. |
| 5,358,640 A | 10/1994 | Zeiher et al. |
| 5,364,439 A | 11/1994 | Gallup et al. |
| 5,376,253 A | 12/1994 | Rychen et al. |
| 5,397,445 A | 3/1995 | Umemura et al. |
| 5,411,641 A | 5/1995 | Trainham, III et al. |
| 5,423,965 A | 6/1995 | Kunz |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,635,071 A | 6/1997 | Al-Samadi |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,030,535 A | 2/2000 | Hayashi et al. |
| 6,060,535 A | 5/2000 | Villar et al. |
| 6,099,716 A | 8/2000 | Molter et al. |
| 6,126,805 A | 10/2000 | Batchelder et al. |
| 6,149,788 A | 11/2000 | Tessier et al. |
| 6,171,374 B1 | 1/2001 | Barton et al. |
| 6,183,643 B1 | 2/2001 | Goodley |
| 6,187,201 B1 | 2/2001 | Abe et al. |
| 6,190,528 B1 | 2/2001 | Li et al. |
| 6,190,558 B1 | 2/2001 | Robbins |
| 6,193,869 B1 | 2/2001 | Towe et al. |
| 6,197,174 B1 | 3/2001 | Barber et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,248,226 B1 | 6/2001 | Shinmei et al. |
| 6,254,741 B1 | 7/2001 | Stuart et al. |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,284,124 B1 | 9/2001 | DiMascio et al. |
| 6,284,399 B1 | 9/2001 | Oko et al. |
| 6,296,751 B1 | 10/2001 | Mir |
| 6,303,037 B1 | 10/2001 | Tamura et al. |
| 6,344,122 B1 | 2/2002 | Deguchi et al. |
| 6,365,023 B1 | 4/2002 | De Los Reyes et al. |
| 6,365,051 B1 | 4/2002 | Bader |
| 6,391,178 B1 | 5/2002 | Garcia et al. |
| 6,402,916 B1 | 6/2002 | Sampson et al. |
| 6,402,917 B1 | 6/2002 | Emery et al. |
| 6,458,257 B1 | 10/2002 | Andrews et al. |
| 6,462,935 B1 | 10/2002 | Shiue et al. |
| 6,482,304 B1 | 11/2002 | Emery et al. |
| 6,495,014 B1 | 12/2002 | Datta et al. |
| 6,508,936 B1 | 1/2003 | Hassan |
| 6,537,436 B2 | 3/2003 | Schmidt et al. |
| 6,645,383 B1 | 11/2003 | Lee et al. |
| 6,649,037 B2 | 11/2003 | Liang et al. |
| 6,726,822 B2 | 4/2004 | Garcia et al. |
| 6,766,812 B1 | 7/2004 | Gadini |
| 6,780,328 B1 | 8/2004 | Zhang |
| 6,824,662 B2 | 11/2004 | Liang et al. |
| 6,896,814 B2 | 5/2005 | Chidambaran et al. |
| 7,083,730 B2 | 8/2006 | Davis |
| 7,459,088 B2 | 12/2008 | Davis |
| 7,501,064 B2 | 3/2009 | Schmidt et al. |
| 8,114,259 B2 | 2/2012 | Zuback et al. |
| 8,182,693 B2 | 5/2012 | Wilkins et al. |
| 8,277,627 B2 | 10/2012 | Ganzi et al. |
| 10,322,953 B2 * | 6/2019 | Ganzi ................ C02F 1/441 |
| 2001/0003329 A1 | 6/2001 | Sugaya et al. |
| 2001/0037942 A1 | 11/2001 | Schmidt et al. |
| 2002/0092769 A1 | 7/2002 | Garcia et al. |
| 2002/0104804 A1 | 8/2002 | Grott |
| 2002/0136749 A1 | 9/2002 | Rose et al. |
| 2002/0144948 A1 | 10/2002 | Aimar et al. |
| 2002/0189951 A1 | 12/2002 | Liang et al. |
| 2003/0080467 A1 | 5/2003 | Andrews et al. |
| 2003/0089609 A1 | 5/2003 | Liang et al. |
| 2003/0106845 A1 | 6/2003 | Bernard et al. |
| 2003/0155243 A1 | 8/2003 | Sferrazza |
| 2003/0201235 A1 | 10/2003 | Chidambaran et al. |
| 2003/0205526 A1 | 11/2003 | Vuong |
| 2004/0007358 A1 | 1/2004 | Lien |
| 2004/0035802 A1 | 2/2004 | Emery et al. |
| 2004/0055955 A1 | 3/2004 | Davis |
| 2004/0079700 A1 | 4/2004 | Wood et al. |
| 2004/0255955 A1 | 12/2004 | Daly |
| 2005/0016922 A1 | 1/2005 | Enzweiler et al. |
| 2005/0016932 A1 | 1/2005 | Arba et al. |
| 2005/0103622 A1 | 5/2005 | Jha et al. |
| 2005/0103630 A1 | 5/2005 | Ganzi et al. |
| 2005/0103631 A1 | 5/2005 | Freydina et al. |
| 2005/0103644 A1 | 5/2005 | Wilkins et al. |
| 2005/0103717 A1 | 5/2005 | Jha et al. |
| 2005/0103722 A1 | 5/2005 | Freydina et al. |
| 2005/0103723 A1 | 5/2005 | Wilkins et al. |
| 2005/0103724 A1 | 5/2005 | Wilkins et al. |
| 2005/0109703 A1 | 5/2005 | Newenhizen |
| 2005/0115906 A1 | 6/2005 | Shay |
| 2005/0121388 A1 | 6/2005 | Wood et al. |
| 2005/0210745 A1 | 9/2005 | Grott |
| 2005/0263457 A1 | 12/2005 | Wilkins et al. |
| 2006/0060532 A1 | 3/2006 | Davis |
| 2006/0091077 A1 | 5/2006 | Haas et al. |
| 2006/0144787 A1 | 7/2006 | Schmidt et al. |
| 2006/0231403 A1 | 10/2006 | Riviello |
| 2006/0231495 A1 | 10/2006 | Freydina et al. |
| 2007/0215344 A1 | 9/2007 | McElhiney |
| 2007/0284251 A1 | 12/2007 | Zuback et al. |
| 2007/0284252 A1 | 12/2007 | Ganzi et al. |
| 2008/0277341 A1 | 11/2008 | Huang et al. |
| 2009/0314718 A1 | 12/2009 | Sparrow et al. |
| 2010/0089756 A1 | 4/2010 | Wilkins et al. |
| 2013/0020259 A1 | 1/2013 | Wallace |
| 2013/0206689 A1 | 8/2013 | Gibson Juby et al. |

FOREIGN PATENT DOCUMENTS

| | | |
|---|---|---|
| CN | 1044411 A | 8/1990 |
| DE | 1201055 B | 9/1965 |
| DE | 2708240 A1 | 8/1978 |
| DE | 3238280 A1 | 4/1984 |

(56) References Cited

FOREIGN PATENT DOCUMENTS

| | | |
|---|---|---|
| DE | 4016000 C2 | 10/1993 |
| DE | 4238532 A1 | 5/1994 |
| DE | 4418812 C2 | 3/1999 |
| DE | 19942347 B4 | 7/2004 |
| EP | 0170895 B1 | 3/1989 |
| EP | 0503589 B1 | 10/1994 |
| EP | 0621072 B1 | 3/1997 |
| EP | 0870533 B1 | 1/2000 |
| EP | 1106241 A1 | 6/2001 |
| EP | 0680932 B1 | 8/2001 |
| EP | 0803474 B1 | 4/2003 |
| EP | 1075868 A3 | 6/2003 |
| EP | 1101790 B1 | 9/2004 |
| EP | 1222954 B1 | 11/2004 |
| EP | 1506941 A1 | 2/2005 |
| EP | 1172145 B1 | 5/2007 |
| EP | 1068901 B1 | 8/2007 |
| EP | 1388595 A1 | 11/2010 |
| EP | 1762546 A1 | 8/2011 |
| FR | 2818267 B1 | 9/2003 |
| GB | 776469 A | 6/1957 |
| GB | 877239 A | 9/1961 |
| GB | 880344 A | 10/1961 |
| GB | 893051 A | 4/1962 |
| GB | 942762 A | 11/1963 |
| GB | 1048026 A | 11/1966 |
| GB | 1137679 A | 12/1968 |
| GB | 1381681 A | 1/1975 |
| GB | 1448533 A | 9/1976 |
| JP | 54-005888 | 1/1979 |
| JP | 05271015 A | 10/1993 |
| JP | 06-000339 A | 1/1994 |
| JP | 06030535 A | 2/1994 |
| JP | 07-155750 A | 6/1995 |
| JP | 07-265865 A | 10/1995 |
| JP | 09-253643 A | 9/1997 |
| JP | 11042483 A | 2/1999 |
| JP | 2001-79358 | 3/2001 |
| JP | 2001-79553 | 3/2001 |
| JP | 2001-104960 A | 4/2001 |
| JP | 2001-113137 A | 4/2001 |
| JP | 2001-113279 A | 4/2001 |
| JP | 2001-113280 A | 4/2001 |
| JP | 2001-121152 A | 5/2001 |
| JP | 2005007347 A | 1/2005 |
| JP | 2005007348 A | 1/2005 |
| RO | 114874 B1 | 8/1999 |
| RU | 216622 | 11/1972 |
| RU | 990256 | 1/1983 |
| RU | 1118389 | 10/1984 |
| RU | 2004137231 A | 6/2006 |
| RU | 2281255 C1 | 8/2006 |
| WO | 9211089 A1 | 7/1992 |
| WO | 9532052 A1 | 11/1995 |
| WO | 9532791 A1 | 12/1995 |
| WO | 9622162 A1 | 7/1996 |
| WO | 9725147 A1 | 7/1997 |
| WO | 9746491 A1 | 12/1997 |
| WO | 9746492 A1 | 12/1997 |
| WO | 9811987 A1 | 3/1998 |
| WO | 9817590 A1 | 4/1998 |
| WO | 9820972 A1 | 5/1998 |
| WO | 9858727 A1 | 12/1998 |
| WO | 9939810 A1 | 8/1999 |
| WO | 0030749 A1 | 6/2000 |
| WO | 0075082 A1 | 12/2000 |
| WO | 0064325 A3 | 6/2001 |
| WO | 0149397 A1 | 7/2001 |
| WO | 0204357 A1 | 1/2002 |
| WO | 0214224 A1 | 2/2002 |
| WO | 0226629 A3 | 12/2002 |
| WO | 03086590 A1 | 10/2003 |
| WO | 2004013048 A2 | 7/2004 |
| WO | 2005087669 A1 | 9/2005 |
| WO | 2005113120 A1 | 12/2005 |
| WO | 2006031732 A2 | 9/2006 |
| WO | 2007145785 A1 | 12/2007 |
| WO | 2007145786 A1 | 12/2007 |
| WO | 2009038805 A1 | 3/2009 |

OTHER PUBLICATIONS

"Desalting Handbook for Planners", Desalination and Water Purification Research and Development Program, Report No. 72, 3rd Edition, Jul. 2003, pp. 1-233.

"Guidelines for the Safe Use of Wastewater, Excreta and Greywater", World Health Organization, vol. 2, Wastewater Use in agriculture, pp. 1-196, undated.

"Preliminary Research Study for the Construction of a Pilot Cogeneration Desalination Plant in Southern California," Water Treatment Technology Program Report No. 7, U.S. Department of the Interior May, 1995.

"Salt Content in Irrigation Water", Lenntech, pp. 1-5, undated.

"SAR Hazard of Irrigation," Lenntech, pp. 1-4, undated.

"Zeta Potential" Lenntech, pp. 1-3, undated.

Almulla et al., "Developments in high recovery brackish water desalination plants as part of the solution to water quantity problems," Desalination 153 (2002) pp. 237-243.

ASTM, "Standard Practice for Calculation and Adjustment of the Langelier Saturation Index for Reverse Osmosis," Designation: D3739-94 (Reapproved 1998) pp. 1-4.

Busch et al., "Reducing energy consumption in seawater desalination," Desalination 165 (2004) 299-312.

Calay, J.-C. et al., "The Use of EDI to Reduce the Ammonia Concentration in Steam Generators Blowdown of PWR Nuclear Power Plants," PowerPlant Chemistry, vol. 2, No. 8, 2000, pp. 467-470.

Chilean Examination Report from corresponding Chilean Patent Application No. 01707-2007, dated Jun. 7, 2011.

Cote, et al, "A new immersed membrane for pretreatment to reverse osmosis," Desalination 139 (2001) 229-236.

Cote, et al, "Use of Ultrafiltration for Water Reuse and Desalination," The ZEEWEED® Ultrafiltration Membrane.

Del Pino et al., "Wastewater reuse through dual-membrane processes: opportunities for sustainable water resources," Desalination 124 (1999) 271-277.

Dimascio et al., "Electrodialesis Polishing (An Electrochemical Deionization Process)," 1994, pp. 164-172.

Dimascio, et al., "Continuous Electrodeionization: Production of High-Purity Water without Regeneration Chemicals," The Electrochemical Society Interface, Fall 1998, pp. 26-29.

Farmer et al., Capacitive Deionization of NH4ClO4 Solutions with Carbon Aerogel Electrodes, J. Appl. Electro-Chemistry, vol. 26, (1996), pp. 1007-1018.

FDA, "Guide to Inspections of High Purity Water Systems," printed from www.fda.gov. on Dec. 28, 2001.

Frost & Sullivan, "Microfiltration and Ultrafiltration Hold Huge Potential for the Desalination Pretreatment Market" published Nov. 14, 2006, Water Online.

Ganzi, G.C. et al., "Electrodeionization: Theory and Practice of Continuous Electrodeionization," Ultrapure Water, Jul./Aug. 1997, pp. 64-69.

Gifford et al. "An Innovative Approach to Continuous Electrodeionization Module ad System Design for Power Applications" 7 pages, Oct. 2000.

Gittens, G.J. et al., "The Application of Electrodialysis to Demineralisation," A.I.Ch.E.I.Chem.E. Symposium Series No. 9, 1965 (London: Instn chem. Engrs), pp. 79-83.

Glueckauf, "Electro-Deionisation Through a Packed Bed," British Chemical Engineering, Dec. 1959, pp. 646-651.

Hell et al., "Experience with full-scale electrodialysis for nitrate and hardness removal," Desalination 117 (1998) 173-180.

Hobro et al., "Recycling of Chromium from Metal Finishing Waste Waters Using Electrochemical Ion Exchange (EIX)," 1994, pp. 173-183.

Jha, Anil D. et al., "CEDI: Selecting the Appropriate Configuration," reprinted from Power Engineering, Aug. 2000 edition.

(56) References Cited

OTHER PUBLICATIONS

Johnson, et al., "Desalting by Means of Porous Carbon Electrodes," Electrochemical Technology, vol. 118, No. 3, Mar. 1971, pp. 510-517.
Kedem et al., "EDS—Sealed Cell Electrodialysis," Desalination, vol. 46, 1983, pp. 291-299.
Kedem et al., "Reduction of Polarization by Ion-Conduction Spacers: Theoretical Evaluation of a Model System," Desalination, vol. 27, 1978, pp. 143-156.
King, C. Judson, et al., "Separation Technology in Japan"; Japanese Technology Evaluation Center; International Tech. Research Institute, Loyola College in Maryland, pp. 1-143, Mar. 1993.
Korngold, "Electrodialysis Process Using Ion Exchange Resins Between Membranes," Desalination, vol. 16, 1975, pp. 225-233.
Laktionov, Evgueni Viktorovitch, "Demineralisation De Solutions Electrolytiques Diluees. Analyse Comparative Des Performances De Differents Procedes D'Electrodialyse", Directuer de these, Universite Montpellier II, Science Et Technique Due Languedoc, Jul. 17, 1998.
Larchet et al., "Application of electromembrane technology for providing drinking water for the population of the Aral region," Desalination 149 (2002) 383-387.
Lesch et al., "A Short Note on Calculating the Adjusted SAR Index" American Society of Agricultural and Biological Engineers, 2009, vol. 52(2), pp. 493-496.
Matejka, "Continuous Production of High-Purity Water by Electro-Deionisation," J. Appl. Chem., Biotechnol., vol. 21, Apr. 1971, pp. 117-120.
Mohammad et al., "Predicting flux and rejection of multicomponent salts mixture in nanofiltration membranes," Desalination 157 (2003) 105-111.
Nesicolaci, M., "Reverse Osmosis is Taking Global Water & Wastewater Treatment by Storm," Water Purification Solutions, Severn Trent Services, undated.
Oren et al., "Studies on Polarity Reversal with Continuous Deionization," Desalination, Elsevier Scientific Publishing Co., Amsterdam, NL, vol. 86, No. 2, Jun. 1, 1992, pp. 155-171.
Pourcelly, Gerald, Conductivity and selectivity of ion exchange membranes: structure-correlations, Desalination, vol. 147 (2002) pp. 359-361.
Public Health and the Environmental World Health Organization, "Desalination for Safe Water Supply, Guidance for the Health and Environmental Aspects Applicable to Desalination," Geneva 2007.
R. Simons, "Electric Field Effects on Proton Transfer Between Ionizable Groups and Water in Ion Exchange Membranes," Electrochimica Acta, vol. 29, No. 2, 1984, pp. 151-158.
R. Simons, "Strong Electric Field Effects on Proton Transfer Between Membrane-Bound Amines and Water," Nature, vol. 280, Aug. 30, 1979, pp. 824-826.
R. Simons, "The Origin and Elimination of Water Splitting in Ion Exchange Membranes During Water Demineralisation by Electrodialysis," Desalination, vol. 28, Jan. 29, 1979, pp. 41-42.
R. Simons, "Water Splitting in Ion Exchange Membranes," Pergamon Press Ltd., 1985, pp. 275-282.
Shaposhnik et al., "Demineralization of water by electrodialysis with ion-exhange membranes, grains and nets," Desalination, vol. 133 (2001), pp. 211-214.
Sirivedhin et al., Reclaiming produced water for beneficial use: salt removal by electrodialysis,: J. of Membrane Science 243 (2004) 335-343.
Tseng, Tai, et al., "Optimization of Dual-Staged Nanofiltration Membranes for Seawater Desalination"; American Water Works Association 2003 CA-NC Annual Fall Conference; Oct. 7, 2003.
U.S. Bureau of Reclamation, Sandia National Laboratories, "Desalination and Water Purification Technology Roadmap—A Report of the Executive Committee," Jan. 2003.
U.S. Congress, Office of the Technology Assessment, "Using Desalination Technologies for Water Treatment," OTA-BP-O-46 (Washington D.C.: U.S. Government Printing Office), Mar. 1988.
USFilter, "CDI-LXtm Systems," product information, 2001, 6 pgs. Mar. 2001.
USFilter, "H-Series Industrial CDI(r) Systems," product information, 1998, 4 pgs.
Von Gottberg et al., "Optimizing Water Recovery and Energy Consumption for Seawater RO Systems," Water & Process Technologies, General Electric Technical Paper (2005).
Walters, et al., "Concentration of Radioactive Aqueous Wastes," Industrial and Engineering Chemistry, Jan. 1955, pp. 61-67.
Wang, et al., A Study of the electrodeionization process—high-purity water production with a RO-EDI system,: Desalination, vol. 132, pp. 349-352, Oct. 3, 2000.
Warshawsky et al., "Thermally Regenerable Polymerable Polymeric Crown Ethers, II Synthesis and Application in Electrodialysis," pp. 579-584, publication and date unknown.
Watson, "The Basics of Seawater Desalting by Reverse Osmosis," Water & Wastes Digest, pp. 16-19, Jan. 2007.
Wood, "Hot Water Sanitization of Continuous Electrodeionization Systems" Pharmaceutical Engineering, vol. 20, No. 6, Nov./Dec. 2000, pp. 1-15.
Wood, J.H. et al., "Continuous Electrodeionisation: Module Design Considerations for the Production of High Purity Water," Proc. of IEX at the Millenium, Jul. 16, 2000, pp. 44-51.
World Bank, "Seawater and Brackish Water Desalination in the Middle East, North Africa and Central Asia," A Review of Key Issues and Experience in Six Countries Final Report, Main Report, Dec. 2004.
World Health Organization, Guidelines for Drinking-Water Quality; Chemical Facts Sheet pp. 296-461 (2003).
www.waterline.com/content/news/article.asp Microfiltration and Ultrafiltration Hold Huge Potential for the Desalination Pretreatment Market, Nov. 14, 2006.
T. Hayes and D. Arthur. "Overview of emerging produced water treatment technologies" The 11th Annual International Petroleum Environmental Conference. Oct. 15, 2004.
Dow Liquid Separations. FILMTEC Membranes (S. S. Beardsley and S. A. McClellan). Membrane Softening: An Emerging Technology Helping Florida Communities Meet the Increased Regulations for Quality Potable Water. Aug. 1997. AWWA 1995 Membrane Technology Conference.

\* cited by examiner

METHOD AND SYSTEM FOR WATER TREATMENT

RELATED APPLICATIONS

This application claims the benefit as a division under 35 U.S.C. § 121 of U.S. application Ser. No. 15/681,577, titled "METHOD AND SYSTEM FOR WATER TREATMENT," filed on Aug. 21, 2017, which claims the benefit as a continuation-in-part under 35 U.S.C. § 120 of U.S. application Ser. No. 13/599,871, titled "METHOD AND SYSTEM FOR WATER TREATMENT," filed on Aug. 30, 2012, which claims priority as a continuation-in-part under 35 U.S.C. § 120 of U.S. application Ser. No. 11/524,078, now U.S. Pat. No. 8,277,627, titled "METHOD AND SYSTEM FOR IRRIGATION," filed on Sep. 20, 2006, which claims priority under 35 U.S.C. § 119(e) to U.S. Provisional Application Ser. No. 60/805,512, titled "ELECTRODIALYSIS FOR DESALINATION OF SEAWATER AND BRACKISH WATER FOR AGRICULTURAL USE" filed on Jun. 22, 2006, and to U.S. Provisional Application Ser. No. 60/804,610, titled "ELECTRODIALYSIS AND FILTRATION FOR AGRICULTURAL WATER PRODUCTION," filed on Jun. 13, 2006, each of which are incorporated herein by reference in their entirety.

BACKGROUND OF INVENTION

1. Field of Invention

This invention relates to systems and methods of providing crop irrigation water as well as potable water and, more particularly, to systems and methods of providing irrigation water and/or potable water from water having unacceptable dissolved solids content.

2. Discussion of Related Art

Climate change is expected to pose an increasing threat to agriculture as global temperatures increase and farms require more water to satisfy the needs of their crops. A constraint to providing increased water by irrigation of farmlands is the availability of freshwater. Agriculture consumes more freshwater than any other industry—an estimated 70% of total global freshwater withdrawal. Many areas are already water stressed. Continued global warming may cause additional problems regarding freshwater availability by, for example, altering the geographical distribution of freshwater and changing the distribution, quantity, and annual timing of rainfall. Accordingly, the production of water suitable for irrigation purposes from otherwise unsuitable water sources may be of increasing importance.

SUMMARY OF INVENTION

Scarcity of irrigation water of sufficient quality is deleterious to crop yields and may require choice of crop species that are of less demand. Newer methods of irrigation that reduce the amount of water used, using techniques such as drip irrigation, may also cause a non-sustainable condition due to salt and impurity buildup in the soil from the water used for irrigation. The soil salinity may rise to much higher concentrations than in the irrigation water due to use of most of the water by the crops, and by evaporation. Conditions of irrigation and soil with inadequate source water for leaching the soil or insufficient rainfall may result in soil salinities 4 to 5 times higher than in the irrigation water itself. Further, should the land consist of relatively shallow impermeable ground layers, the irrigation water may raise the water table. When highly saline ground water reaches crop root levels, the water may be harmful to crop growth. Also, saline soils may damage leafy crops due to water splash off the soil surface. Furthermore, if the agricultural land is drained of the saline water, trace impurities in the soil such as selenium or boron, or residual contaminants from fertilizer use such as nitrate may cause contamination of the drainage water and cause difficulties in safe effluent control.

Irrigation water needs also are in competition with potable drinking water for humans, and water free of contaminants for livestock, and wildlife. Thus it is commonly the case that a source of a combination of irrigation water and potable water are needed in agricultural regions.

Desalting or desalination refers to a water treatment process that removes salt from, for example, water. In some cases, the water source is brackish water or seawater and desalting techniques thereof provide at least a portion of municipal requirements for potable, drinking water. Desalination techniques typically include those based on distillation as well as reverse osmosis techniques. However, these techniques suffer from their inherent removal of many of the salts which are beneficial to crops while not removing other impurities that may be harmful. The desalted water can also be consumed in commercial and industrial applications as, for example, process feed water, boiler feed water, and irrigation water. Particular examples of industries that may utilize desalted water include the pharmaceutical, mining, paper and pulp, and agricultural industries.

In accordance with an aspect of the present invention, there is provided a water treatment system for producing water for irrigation. The system comprises an electrodialysis apparatus including one or more monovalent ion selective membranes and having an inlet fluidly connectable to a source of water to be treated having a concentration of dissolved salts of between 500 mg/L and 5,000 mg/L, a diluate outlet, and a concentrate outlet, a nanofiltration apparatus positioned downstream of the electrodialysis apparatus and having an inlet fluidly connectable to the diluate outlet of the electrodialysis apparatus, a permeate outlet, and a retentate outlet, an irrigation distribution system fluidly connectable to the retentate outlet of the nanofiltration apparatus and with the diluate outlet of the electrodialysis apparatus, and a diverting system configured to vary an amount of diluate from the electrodialysis apparatus directed to the irrigation distribution system and an amount of diluate from the electrodialysis apparatus directed to the nanofiltration apparatus.

In some embodiments, the system further comprises a conduit fluidly connecting a concentrate inlet of the electrodialysis apparatus to the inlet fluidly connectable to the source of water to be treated.

In some embodiments, the system further comprises a pre-filtration system in fluid communication between the source of water to be treated and the inlet of the electrodialysis apparatus, the pre-filtration system including at least one of a microfilter, a settler, a screen filter, and a coarse particle filter.

In some embodiments, the system further comprises a conduit fluidly connecting the permeate outlet of the nanofiltration apparatus to an inlet of a concentrating compartment of the electrodialysis apparatus.

In some embodiments, the one or more monovalent ion selective membranes includes one of one or more monovalent anion selective membranes and one or more monovalent cation selective membranes. The one or more monovalent anion selective membranes may have a selectivity coefficient of at least about 2 for one of chloride over sulfate or sodium over calcium.

In some embodiments, the electrodialysis apparatus is configured to produce diluate having a sodium adsorption ratio (SAR) value of less than about 10. The electrodialysis apparatus may be configured to produce diluate having a SAR value of less than about 5. The nanofiltration apparatus may be configured to produce retentate having a SAR value less than the SAR value of the diluate. The nanofiltration apparatus may be configured to produce retentate and permeate, the retentate having a SAR value less than the SAR value of the permeate.

In some embodiments, the electrodialysis apparatus is configured to produce diluate having a higher concentration of divalent cations including magnesium and calcium than a concentration of the divalent cations in the water to be treated and a lower concentration of monovalent cations including sodium than a concentration of the monovalent cations in the water to be treated.

In some embodiments, the nanofiltration apparatus is configured to produce retentate having a higher concentration of the divalent cations than the concentration of the divalent cations in the diluate and a lower concentration of the monovalent cations than the concentration of the monovalent cations in the diluate.

In some embodiments, the system further comprises a controller configured to adjust the amount of diluate from the electrodialysis apparatus directed to the irrigation distribution system and the amount of diluate from the electrodialysis apparatus directed to the nanofiltration apparatus with the diverting system in any amount from 0% to 100% of an amount of diluate produced in the electrodialysis apparatus. The controller may be configured to adjust the amount of diluate directed to the irrigation distribution system and the amount of diluate directed to the nanofiltration apparatus depending on a relative demand for irrigation water and potable water.

In some embodiments, the system further comprises a mixer configured to blend diluate produced in the electrodialysis apparatus with any retentate produced in the nanofiltration apparatus and produce irrigation water having a SAR value intermediate of a SAR value of the diluate and a SAR value of the retentate.

In some embodiments, the system further comprises a sensor in communication with the controller, the sensor configured to provide the controller with an indication of one or more parameters of one of diluate from the electrodialysis apparatus and retentate from the nanofiltration apparatus, the controller configured to adjust the diverting system responsive to the indication of the one or more parameters.

In some embodiments, the system further comprises a sensor in communication with a controller, the sensor configured to provide the controller with an indication of one or more parameters of one of diluate from the electrodialysis apparatus and retentate from the nanofiltration apparatus, the controller configured to adjust one or more operating parameters of the electrodialysis apparatus responsive to the indication of the one or more parameters.

In accordance with another aspect, there is provided a method of treating brackish water to produce irrigation water. The method comprises directing water to be treated having a concentration of dissolved salts of between 500 mg/L and 5,000 mg/L to an inlet of an electrodialysis apparatus including one or more monovalent ion selective membranes, treating the water to be treated in the electrodialysis apparatus to produce a diluate, determining an amount of the diluate to direct to an irrigation distribution system and an amount of the diluate to direct to an inlet of a nanofiltration apparatus, treating any diluate directed to the inlet of the nanofiltration apparatus in the nanofiltration apparatus to produce a permeate and a retentate, and combining any retentate with the amount of the diluate directed to the irrigation distribution system at the irrigation distribution system.

In some embodiments, the method further comprises directing at least a portion of any permeate produced in the nanofiltration apparatus to a concentrating compartment of the electrodialysis apparatus.

In some embodiments, producing the diluate in the electrodialysis apparatus comprises producing treated water having a SAR value of less than about 10. Producing the diluate in the electrodialysis apparatus may comprise producing treated water having a SAR value of less than about 5.

In some embodiments, producing the retentate in the nanofiltration apparatus comprises producing treated water having a SAR value of less than the SAR value of the diluate.

In some embodiments, the method further comprises directing at least a portion of the diluate to the irrigation distribution system. Combining any retentate with the portion of the diluate directed to the irrigation distribution system comprises producing irrigation water with a SAR value intermediate of a SAR value of the diluate and a SAR value of the retentate. Combining any retentate with the portion of the diluate directed to the irrigation distribution system may comprise producing irrigation water with a SAR value of less than about 8 and a total dissolved solids level of greater than about 1,500 ppm.

In some embodiments, the method further comprises adjusting an amount of diluate from the electrodialysis apparatus directed to the irrigation distribution system and the amount of diluate from electrodialysis apparatus directed to the nanofiltration apparatus based on one or more parameters of one of the diluate from the electrodialysis apparatus and any retentate from the nanofiltration apparatus.

In some embodiments, the method further comprises adjusting one or more operating parameters of the electrodialysis apparatus based on one or more parameters of one of the diluate from the electrodialysis apparatus and any retentate from the nanofiltration apparatus.

In some embodiments, the method further comprises pre-filtering the water to be treated prior to directing the water to be treated to the inlet of the electrodialysis apparatus.

In some embodiments, the method further comprises directing permeate suitable for use as potable water from the permeate outlet of the nanofiltration apparatus to a potable water point of use.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
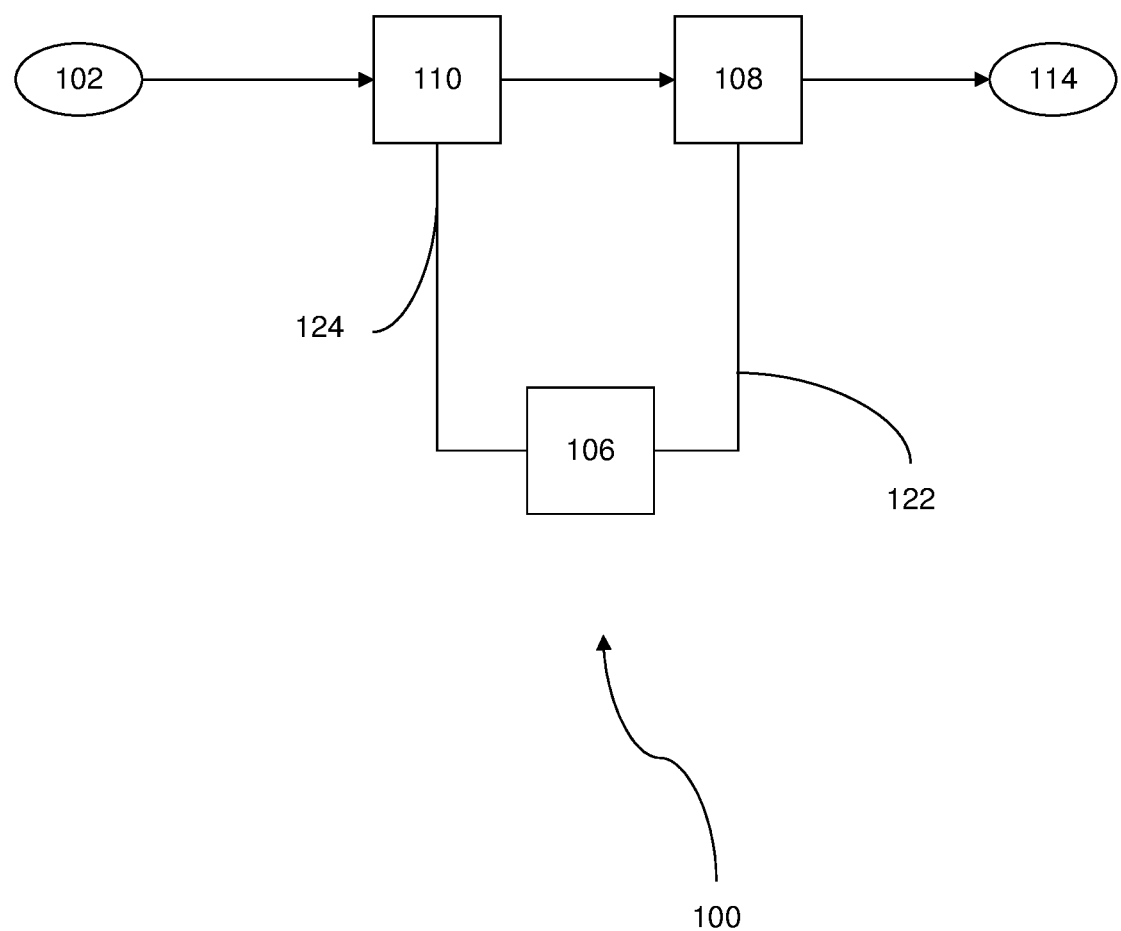
FIG. 1 is a schematic illustration of a system in accordance with one or more features of the invention.

This invention is not limited in its application to the details of construction and the arrangement of components set forth in the following description or illustrated in the drawings. The invention is capable of embodiments and of being practiced or of being carried out in various ways beyond those exemplarily presented herein.

One or more aspects of the invention can involve systems and techniques for providing water suitable for agricultural facilities. Other aspects of the invention can provide potable water or water suitable for human use or consumption as well as for livestock and poultry. Some systems and techniques of the invention can convert or otherwise render non-potable water suitable for agricultural, livestock, poultry, and/or human consumption. Still further aspects of the invention can involve systems and techniques that preferentially or selectively remove some species over other species from a fluid to be treated to provide a product having one or more desirable characteristics. In contrast with non-selective techniques, some selective removal aspects of the invention can be more cost effective by avoiding or reducing additional post-treatment processes, for example, blending. Thus, the systems and techniques of the invention economically provide treated water that is more suitable for an intended use.

In some embodiments of the invention, some types of species are retained in a treated fluid stream while other types of species are preferentially removed. The resultant product fluid can be utilized in various applications and/or otherwise satisfy one or more objectives. Other aspects of the invention can involve systems and techniques that provide water having one or more properties or characteristics tailored to satisfy a particular purpose. Some embodiments of the invention can thus involve systems and techniques that provide one or more water streams or bodies that have one or more attributes that have been adjusted based on one or more parameters of the point of use or facility in which the stream or body is to be utilized.

Even further aspects of the invention can involve systems and techniques that economically provide water for agricultural, industrial, commercial, and/or residential service. Further, some particular aspects of the invention can involve providing water to serve a plurality of requirements or levels of purity or quality. Thus in some embodiments, the systems and techniques of the invention can provide one or more water streams or bodies in a mixed use facility. Particularly advantageous aspects of the invention can involve providing the plurality of water streams or bodies, each of which may have differing water quality levels, from a source of water having high solids content, to a plurality of points of use, each of which may have differing requirements. Such aspects of the invention can provide systems and techniques that treat, for example, non-potable water to render it potable and/or suitable for irrigation, for livestock and/or poultry consumption, and/or for human consumption or use.

In some aspects of the invention, water having a high level of one or more objectionable species dissolved therein can be treated to remove or at least reduce the concentration of such species to an acceptable level. The one or more objectionable species can be any species that render the untreated water unsuitable for a particular application. For example, the water may contain a high level or undesirable concentration of monovalent cations and/or anions which adversely or undesirably hinders retention of water in soil or adsorption of other species, including, for example, divalent or even multivalent species. If the requirement is pertinent to crop irrigation, the undesirable condition or characteristic can involve water that contains one or more species that affects the permeability and/or infiltration properties of the soil being irrigated. For example, some aspects of the invention can involve rendering or treating water to preferentially remove monovalent species over non-monovalent species.

In accordance with one or more particular aspects, the invention can involve embodiments directed to systems and/or methods comprising providing or introducing water to be treated into an electrically-driven separation apparatus. Some embodiments of the invention can involve an irrigation system comprising an electrically-driven separation apparatus fluidly connected, or at least connectable, to one or more sources of water to be treated and at least one irrigation water distribution system.

Other aspects of the invention may involve a method of providing potable water. Some aspects of the invention can provide irrigation water and/or potable water without thermally-driven separation techniques or unit operations. For example, a method in accordance with some embodiments of the invention can comprise one or more acts or steps of providing water to be treated and treating at least a portion of the water to be treated in an electrically-driven separation apparatus to produce a first treated water. The method can further comprise one or more acts of treating a portion of the water to be treated, typically a separate portion, in one or more pressure-driven separation apparatus to produce a second treated water. In some cases, the method can further comprise a step of mixing the first treated water and the second treated water to produce the potable water. The potable water typically has a target or desired total dissolved solids (TDS) content, for example, a TDS content of less than about 500 ppm.

Aspects of the invention directed to systems that provide potable water can comprise a source of water to be treated and a pressure-driven separation apparatus having an inlet that is fluidly connected, or at least connectable, to the source of water to be treated. The pressure-driven apparatus can also have one or more outlets, typically at least one product outlet as a treated water outlet. The pressure-driven separation apparatus typically also has at least one reject outlet as an outlet for a stream containing one or more species, typically an undesirable species, removed from the treated water. The system for providing potable water can further comprise one or more electrically-driven separation apparatus which can be fluidly connected, or connectable, to the source of water to be treated, to the pressure-driven separation apparatus, or both. For example, as described in further detail below, one or more electrically-driven separation apparatus can be fluidly connected to a reject outlet of the pressure-driven separation apparatus. In accordance with particular embodiments of the invention, the system for providing potable water can further comprise one or more mixers having one or more inlets fluidly connected, or connectable, to the treated water outlet of the pressure-driven apparatus and the product water outlet of the electrically-driven separation apparatus. The mixer can comprise any mixing unit operation that facilitates at least partially blending or combining one or more product streams including, in some cases, a stream from the source of water to be treated to form a final product stream having one or more desirable characteristics.

The water to be treated can comprise brackish water having a TDS of between about 1,500 mg/L (1,500 ppm) and about 5,000 mg/L (5,000 ppm), and/or saline water containing high concentrations of dissolved solids or salts, for example, a concentration of dissolved salts of between about 500 mg/L and about 5,000 mg/L. Other sources of water to be treated can comprise water that would be unsuitable for use in agricultural facilities because of infiltration and/or toxicity considerations.

The systems and techniques of the invention can comprise, where appropriate, pre-treatment subsystems to facilitate one or more operating principles thereof. One or more pre-treatment and/or post-treatment unit operations may be utilized in one or more embodiments of the invention. For example, the systems and techniques of the invention may comprise a pre-treatment subsystem including one or a plurality of filters or screens that separate or remove at least a portion of any suspended solids from the water to be treated. Such pre-treatment subsystems typically remove particulate material that would damage any downstream unit operation of the systems of the invention. In some embodiments, the pre-treatment subsystem may include a VACLEEN® stainless steel self-cleaning filtration system available from Evoqua Water Technologies LLC. Other pre-treatment unit operations may include, for example, microfilters and/or sedimentary-based systems that can remove suspended solids having characteristic dimensions of, for example, one micron or greater. For example, in some embodiments, the pre-treatment subsystem may include a Vortisand® cross flow microsand submicron filtration system available from Evoqua Water Technologies LLC.

Further pre-treatment operations may be utilized to improve the effectiveness of one or more unit operations of the invention. For example, a pre-treatment subsystem can comprise coolers or heaters that, respectively, cool or heat the water to be treated prior to separation operations. Cooling of the raw feed stream, or any intermediate process stream may be performed to, for example, facilitate the transport of an undesirable species, or to hinder the transport of a desirable species, from the stream to be treated. Likewise, heating may be performed to raise the temperature of the raw feed stream, or one or more intermediate process streams, to a desired temperature that, for example, facilitates economical or efficient operation of the one or more separation apparatus. Non-limiting examples of heating processes may involve heaters, furnaces, or heat exchangers that may be associated with or be a unit operation of a process or system of the invention. For example, heating may be provided through a heat exchanger of a power plant that is not necessarily associated with the treatment systems of the invention.

Pre-treatment systems may also or alternatively be used to remove or reduce the concentration one or more species in the water to be treated to improve the effectiveness of one or more treatment unit operations, reduce the potential for scaling, or remove undesirable species that may be difficult to remove in the one or more treatment unit operations. For example, the pH of the water to be treated may be adjusted to cause one or more dissolved species to precipitate or to be converted into a different form so that it may be removed from the water to be treated by, for example, filtration, settling, or air stripping. pH adjustment agents that may be used include, for example, hydrochloric acid, sulfuric acid, sodium hydroxide, or any other pH adjustment agent known in the art. Species that may be removed from the water to be treated may include, for example, elemental or ionic forms or compounds of any one or more of bicarbonate, iron, manganese, arsenic, sulfur, selenium, boron, or silica. In other embodiments, a pre-treatment system may include a water softening apparatus, for example, an ion exchange system that may remove hardness components, for example, calcium from the water to be treated.

Post-treatment unit operations may polish, remove, or reduce the concentration one or more species in the treated water. For example, one or more ion exchange columns may be utilized to remove species that are not readily removed in the electrically-driven separation apparatus and/or the pressure-driven separation apparatus. Non-limiting examples of species that would typically be removed or at least have a reduction in concentration to, preferably, non-toxic and/or non-objectionable levels, in post-treatment operations include those that may affect soil aggregation, water infiltration, and/or would be toxic to plant growth such as aluminum, arsenic, beryllium, boron, cadmium, cobalt, chromium, copper, iron, fluoride, lithium, manganese, molybdenum, nickel, lead, selenium, tin, titanium, tungsten, vanadium, boron, and zinc. An example of an ion exchange resin that may be utilized to remove species such as boron is the AMBERLITE™ PWA10 boron selective ion exchange resin available from the Dow Chemical Company. Other species that may be addressed by one or more post-treatment operations include those that may be toxic or objectionable to humans, poultry, and/or livestock in drinking water such as, but not limited to, nitrates, nitrites, selenium, boron, vanadium, and sulfides. Disinfecting processes may also be performed to at least partially inactivate or reduce the concentration of colony-forming microorganisms that may be harmful to human and/or livestock.

Alternatively, or in combination with the one or more polishing unit operations, the systems and techniques of the invention may involve adding one or more species to at least a portion of the treated water. For example, gypsum may be added to adjust the concentration of one or more desirable species or adjust a characteristic of the water. Other additives may include fertilizers or other supplements that facilitate crop growth when the water is used for irrigation.

An electrically-driven apparatus typically utilizes a potential field to create a motive force that induces one or more species, typically the target species, which can include desirable as well as undesirable species, to migrate from the carrier or fluid. The electrically-driven apparatus can utilize one or more components that segregate the target species during migration and/or inhibit the return or reverse process. Non-limiting examples of such devices include electrodialysis (ED) devices, including current reversing electrodialysis (EDR) devices. The present invention, however, is not limited to one or a combination of such electrically-driven apparatus and may be practiced in other apparatus that provide a motive force that facilitates the preferential migration of one or more target species over other species in the fluid to be treated.

The electrically-driven separation apparatus of the invention typically utilize ion selective membranes to facilitate separation phenomena. In some cases, the selectively permeable membrane can preferentially or selectively allow transport of some species relative to other species. For example, cation selective membranes may be utilized in some compartments of the electrically-driven separation apparatus. In other embodiments, anion selective membranes may be utilized in one or more compartments in addition to or instead of the cation selective membranes. In still other embodiments, the electrically-driven separation apparatus of the invention may comprise one or more monovalent ion selective membranes to selectively promote transfer of the monovalent cationic or anionic species. Indeed, in some embodiments of the invention, the separation apparatus of the invention may comprise monovalent cation selective membranes and one or more monovalent anion selective membranes, typically in one or more concentrating compartments of the apparatus. Non-limiting examples of commercially available monovalent selective membranes include NEOSEPTA® cation and anion selective membranes from ASTOM Corporation, Tokyo, Japan or Tokuyama Corporation, Tokyo, Japan. The monovalent cation or monovalent anion selective membranes may have a selectivity of, for example, greater than about 2, greater than about 5, or greater than about 10. In some embodiments, the monovalent cation selective membranes may have a selectivity coefficient for sodium over calcium of at least about 2, at least about 5, or at least about 10. In some embodiments, the monovalent anion selective membranes may have a selectivity coefficient for chloride over sulfate of at least about 2, at least about 5, or at least about 10. The monovalent cation and or anion selective membranes may provide for the embodiments of electrically-driven separation apparatus to be operated to produce treated water (diluate) having a sodium adsorption ratio (SAR) of less than about 20, less than about 10 or less than about 5 from brackish water having a TDS of between about 1,500 mg/L (1,500 ppm) and about 5,000 mg/L (5,000 ppm), and/or water containing high concentrations of dissolved solids or salts, for example, a concentration of dissolved salts of between about 500 mg/L and about 5,000 mg/L. These SAR values may be achievable due to the preferential transfer of monovalent cations vs. divalent or multivalent cations into concentrating compartments of the electrically-driven separation apparatus, thus increasing a ratio of the divalent or multivalent cations to monovalent cations in the diluting compartments of the electrically-driven separation apparatus.

A pressure-driven separation apparatus typically utilizes one or more barriers to inhibit migration of a first species therethrough while allowing penetration of another. The motive force facilitating the separation phenomena typically involve pressurizing fluid to be treated. Non-limiting examples of pressure-driven separation apparatus include microfiltration and nanofiltration (NF) apparatus as well as reverse osmosis (RO) systems. NF apparatus typically selectively pass monovalent ions as compared to divalent or multivalent ions. Accordingly, the permeate produced in a NF apparatus may have a higher concentration ratio of monovalent ions than divalent or multivalent ions than the ratio of monovalent to divalent ions in the retentate produced in a NF apparatus. The retentate produced in a NF apparatus may thus have a lower SAR value than either the permeate or the water influent to be treated in the NF apparatus. Examples of nanofilters that have a high selectivity for passing monovalent as compared to divalent ions and may be utilized in various embodiments disclosed herein may include SWSR nanofiltration membranes available from the General Electric Company, NF245 nanofiltration membranes, NF 270 nanofiltration membranes, or NF345 nanofiltration membranes, available from the Dow Chemical Company or ESNA1-LF-LD nanofiltration membranes or HYDRACoRe10 nanofiltration membranes available from Hydranautics.

One or more embodiments of the invention can be directed to a water treatment system 100 as exemplarily shown in FIG. 1. System 100 can be a system for providing potable water, irrigation water, or both, to, for example, a point of use 114. The treatment system 100 can comprise at least one separation unit operation or separation apparatus 110 that, in some cases, selectively removes one or more species or types of species from the source 102 of water to be treated. The system can optionally comprise one or more monitoring subsystems that provide an indication of one or more operating characteristics of the treatment system. As illustrated, system 100 can have one or more monitoring sensors 108 that typically provide an indication of water quality produced, or otherwise treated, from the separation apparatus 110. In some aspects of the present invention, system 100 can utilize a control system or controller configured or constructed and arranged to regulate one or more parameters of one or more unit operations in the systems of the invention. Referring again to FIG. 1, system 100 can thus have one or more controllers 106 that adjust at least one operating parameter of separation apparatus 110 typically to at least one desired condition. The one or more monitoring sensors 108 may communicate with the one or more controllers 106 though a communications network including, for example, a signal line 122, or additionally or alternatively, through a wireless communication link. The one or more controllers 106 may communicate with the at least one separation unit operation or separation apparatus 110 though a communications network including, for example, a signal line 124, or additionally or alternatively, through a wireless communication link. Any suitable control technique may be utilized to adjust the at least one operating parameter of any unit operation in system 100 to provide treated water having the one or more desired characteristics.

The systems and techniques of the invention may include one or more water distribution systems that facilitate delivery of the treated water to one or more points of use. For example, the distribution system may include an irrigation distribution system that delivers irrigation water to various points of use in an agricultural facility. To facilitate the delivery of the treated water, the distribution system can include one or more storage systems, such as reservoirs, tanks, wells, or other vessels and containers. The irrigation systems of the invention may utilize overhead and/or surface irrigation techniques to convey water to a designated area. The irrigation system components can thus employ non-movable as well as mobile devices.

The one or more storage systems may be considered as part of the distribution system or be an ancillary subsystem of the treatment system. The one or more storage systems may further facilitate providing treated water having desired characteristics. For example, treated water having a first condition or characteristic may be stored in one or more storage companions prior to further treatment or processing, for example, blending, with another treated or untreated water body or stream.

Figure 2:
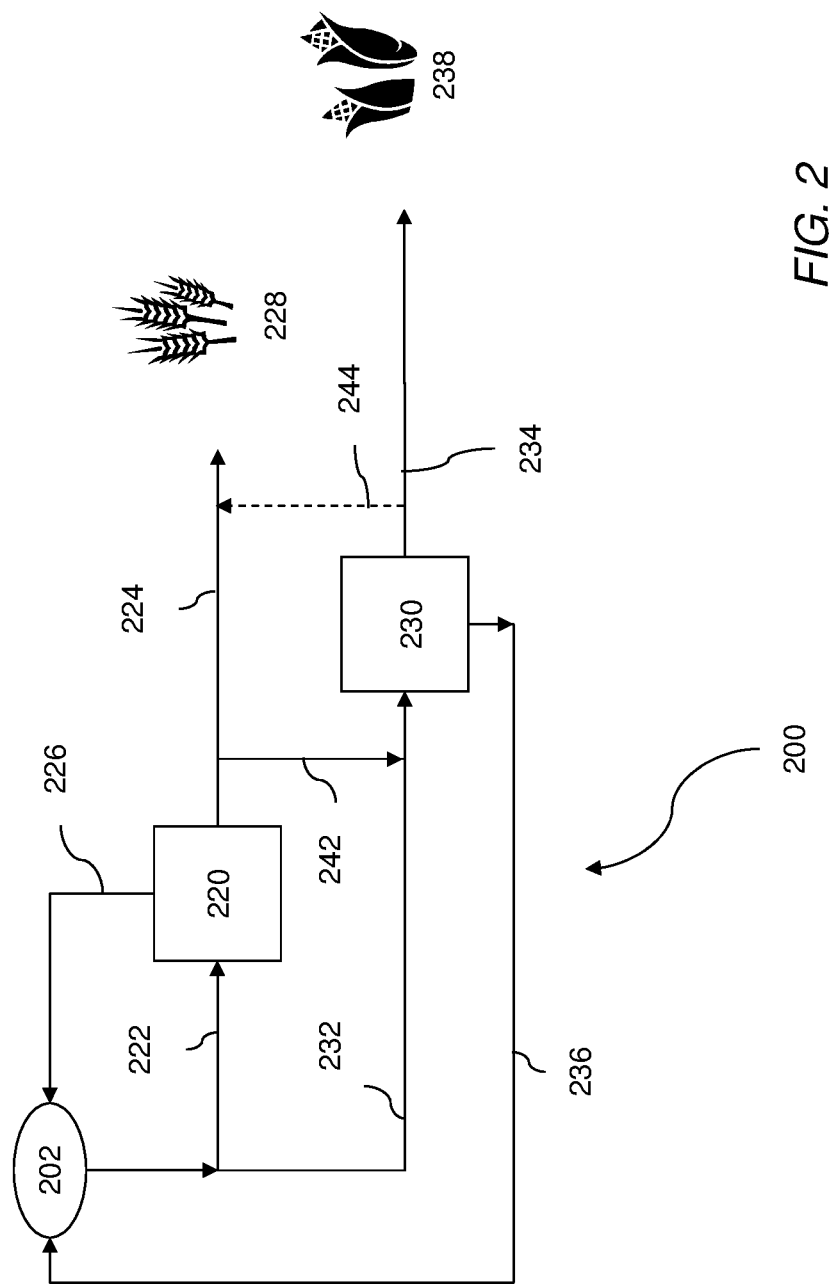
FIG. 2 is a schematic illustration of an irrigation system in accordance with further features of the invention.

FIG. 2 is a schematic diagram exemplarily showing some features of the invention pertinent to an irrigation system 200. Irrigation system 200 can comprise a separation apparatus 220 fluidly connected and, as illustrated, disposed to receive water to be treated from source 202, for example, through conduit 222. Separation apparatus 220 can treat water from source 202 and provide treated water to a first point of use 228, illustrated herein as a first type of crop through irrigation water distribution system 224. Point of use 228 can be a portion of a crop that, for example, is at a stage of growth different from at least one portion of the entire crop. System 200 can further comprise one or more second separation apparatus 230. Separation apparatus 230 can also treat water from source 202 and provide treated water to a second point of use 238, illustrated as a second type of crop, through second irrigation distribution system 234. Second point of use 238 may be a portion the same type of crop to be irrigated as, for example, first point of use 228 or a portion of a second crop at a different stage of growth. In accordance with some embodiments of the invention, separation apparatus 230 can optionally provide treated water to first point of use 228, instead of and/or to supplement treated water from separation apparatus 220, through conduit or connection 244. Some embodiments of the invention contemplate, at least partially, a staged treatment scheme. For example, first separation apparatus 220 may provide treated water having a first water quality or characteristic which can further be treated in second separation apparatus 230 through conduit or distribution system 242. A plurality of second separation apparatus 230 may be utilized with one or more first separation apparatus 220 to provide treated water to one or more points of use. Some embodiments of the invention may involve serial arrangement of separation apparatus and other embodiments may utilize separation apparatus in parallel configurations to provide treated water so as to satisfy the volumetric requirements of the one or more points of use. For example, water to be treated from source 202 may be provided in parallel to both first separation apparatus 220 and second separation apparatus 230 through conduits or distribution systems 222 and 232, respectively. In some cases, however, a combination of serial and parallel treatment paths may be implemented to provide treated water at a rate or a plurality of rates, wherein each of the one or more treated water streams have one or more desired characteristics.

System 200 can include one or more controllers (not shown) to control one or more operating parameters of any component or subsystem of system 200. Like the system exemplarily illustrated in FIG. 1, system 200 can have one or more controllers that can adjust one or more operating parameters. For example, one or more controllers of system 200 can have adjust the current, potential, or both, of the applied electric field in any of the separation apparatus. Other parameters that may be adjusted include, for example, TDS content, pressure, temperature, pH, flow ratio or any combination, of any stream of the system.

In accordance with some aspects of the invention, the one or more characteristics of the treated water stream can be any measured or derived attribute of the product stream so as to render it suitable for its intended use at point 114. However, the invention is not limited as such; for example, the characteristic of the water may be an attribute of the treated or product water stream in terms relative to the water stream to be treated. The attribute or parameter can be a singular or a composite or aggregate characteristic of the water. Specific, non-limiting examples of such attributes can include the conductivity or resistivity of the water, the presence, absence, or concentration of one more particular species or kinds of species in the water, as well as combinations thereof.

In accordance with one or more embodiments of the invention, the systems and techniques of the invention provide water having a desired water attribute can be represented or quantified as a composite character. The composite character can provide an indication of suitability of the treated water for a particular purpose. Consequently, the systems and techniques of the invention can involve operations that seek or at least promote providing water having one or more desired composite characteristics. In irrigation applications, the treated water attribute can be related to its suitability as irrigation water. Thus, some aspects of the invention can be directed to treating non-potable water and rendering the water, as treated water, suitable for irrigation in one or more agricultural facilities by adjusting one or more characteristics thereof. Some aspects of the invention can provide irrigation water tailored to one or more crops grown or cultivated in one or more agricultural facilities. For example, with reference again to FIG. 2, the systems and techniques of the invention can provide a first treated water, having a first composite characteristic, to a first type of crop 228 and a second treated water, having a second composite characteristic, to a second type of crop 238. The second treated water can be used to supplement and/or adjust the characteristic of the first treated water and, conversely, the first treated water can be used to adjust one or more characteristics of the second treated water. The one or more characteristics can be adjusted to meet a particular requirement by, for example, mixing together or blending the one or more treated water streams. The particular target characteristic can be achieved by regulating the ratios or relative amounts or rates of the treated water streams to be mixed. The treated water streams may be mixed in any ratio desired, for example, by mixing from 0% (no mixing) to 100% of a the first treated water with the second treated water or by mixing from 0% (no mixing) to 100% of a the second treated water with the first treated water.

During typical operation, each of the one or more separation apparatus 220 and 230 typically generates one or more secondary streams. Typically, the one or more secondary streams contain an unacceptable level of one or more undesirable species. Any one or more secondary streams can be discharged as waste streams. For example, the waste stream typically containing the one or more species transferred from the stream treated in separation apparatus 230 can be discharged or transferred to the source of water to be treated 202 through conduit or distribution system 236. The waste stream typically containing the one or more species transferred from the stream treated in separation apparatus 220 can be discharged or transferred to the source of water to be treated 202 through conduit or distribution system 226. Likewise, other embodiments of the invention contemplate combining one or more secondary streams, typically from one or more downstream separation apparatus, with a water stream to be treated in one or more upstream separation apparatus. For example, one or more streams output from a downstream electrically-driven or pressure-drive separation apparatus may be returned to an upstream electrically-driven separation apparatus as concentrate makeup or diluate makeup. The waste stream can also be discharged with other streams that may or may not be directly associated with the treatment system. For example, the stream to be discharged may be returned to the source of water to be treated after being mixed with one or more blow down streams from, for example, a cooling tower, which may not be a unit operation of the treatment system. In other cases, however, the one or more waste streams may be stored and combined with water having very low salinity to mitigate water infiltration problems that could result in leaching soluble minerals, and salts such as calcium from surface soils.

In some embodiments of the invention, the secondary stream from second separation apparatus 230 contained in conduit 236 can be introduced into first separation apparatus 220, alone or combined, as shown in FIG. 2, with water to be treated from source 202 as delivered through conduit 222.

The schematically illustrated systems depicted in FIGS. 1 and 2 may further comprise unit operations that facilitate the treatment of water. For example, an optional system may be utilized upstream of separation apparatus 220 and 230 to filter or otherwise remove at least a portion of suspended solids in the water from source 202. Non-limiting examples of pre-treatment unit operations that may be utilized to reduce the concentration of at least one suspended solid entrained in the water to be treated include microfilters, settlers, screen filters, and coarse particle filters.

Further, one or more unit operations may be utilized to further process one or more of the treated water streams. For example, a polishing bed may further remove one or more species from one or more of the treated streams in distribution systems 224 and 234. Non-limiting examples of such unit operations that can be utilized to remove at least a portion of weakly ionized or ionizable species, such as, but not limited to, boron, selenite, and arsenic, include ion exchange columns.

Further unit operations that facilitate post-treatment of one or more treated water streams of the invention include those that add or otherwise adjust a concentration of one or more desirable species or characteristics of the water stream. Post-treatment operations may be employed to render the one or more waste streams suitable for discharge to the environment.

Accordingly, a mixer may be disposed downstream of one or more separation apparatus of the invention that facilitates incorporation of another treated or untreated water stream, disinfectants, nutrients, and/or desirable salts from one or more sources of such. In accordance with some embodiments of the invention, one or more sources of a salt can be disposed to be introduced into the treated water stream. For example, a separation apparatus may be utilized in the treatment or irrigation system of the invention that selectively removes or reduces the concentration of divalent or other non-monovalent species from a water stream to be treated. Such an optional apparatus would typically provide at least one product stream having a relatively high concentration of non-monovalent species which can be introduced to the treated stream to adjust at least one characteristic thereof so as to provide a stream or body of water with a target or desirable condition. Examples of systems and techniques that advantageously provide beneficial species-rich streams include those disclosed in co-owned U.S. Pat. No. 7,820,024, titled "Electrically-Driven Separation Apparatus," which is incorporated herein by reference. In some cases, however, one or more otherwise unconnected or distinct sources of, for example, calcium and/or magnesium salts, may be utilized to adjust one or more characteristics of the treated water stream prior to its use. Additionally, one or more intrinsic and/or extrinsic properties of the water stream may be further adjusted. For example, the water stream may be cooled or heated to adjust the temperature thereof. The pH of the water stream or body may also be adjusted by, for example, adding one or more acids or bases, to achieve a desired pH value. The desired property or characteristic may be dependent on a plurality of factors including, for example, the pH of the soil to be irrigated, the salt tolerance the crops to be irrigated and, in some cases, the moisture content of the soil. Thus, some features of the invention provide further capabilities directed to achieving one or more desired composite characteristics.

The further adjustment of the one or more properties or characteristics may be performed after treatment in the separation apparatus, prior to use or introduction to the point of use, or during storage of the treated water in one or more reservoirs.

However, some aspects of the invention contemplate beneficial or economically attractive attributes of such secondary streams containing high concentrations of one or more dissolved species, relative to the first or treated product stream and/or the stream introduced into the separation apparatus. For example, the secondary product stream may contain high dissolved solids and can serve as a feed stream that may be further processed to obtain additional products or at least provide a product stream having a high concentration of a desirable species.

One or more characteristics of the water utilized in some systems and techniques of the invention can provide an indication of the suitability of the water for agricultural use. For example, the one or more characteristics of the water can be represented as the salinity, as total dissolved salts or solids content, and/or electrical conductivity, as well as or in conjunction with any of the alkalinity, iron content, and pH of the water. In some cases, the level of salinity of the water can become a selective parameter when considered relative to the type of crops to be irrigated by the at least partially treated water. Thus, in accordance with some aspects of the invention, the salinity of the water may be used as a factor to consider when making a determination whether to adjust at least one operating parameter of the systems of the invention. In other embodiments of the system and techniques of the invention, the characteristic value can be represented as a ratio of the concentration of species that tends to render soil as water-impermeable relative to the concentration of species that tends to render soil as aggregating or water-adsorbing.

In accordance with some aspects of the invention, the characteristic value can provide an indication of the suitability of the water for irrigation purposes, for human consumption, and/or for livestock or poultry use. In some embodiments, the characteristic value of a water stream or body can be represented as a ratio of the concentration of monovalent species relative to the concentration of divalent species in the water. For example, the characteristic value can be at least partially expressed as the sodium adsorption ratio (SAR) or exchangeable sodium percentage. Preferably, the SAR value of a stream or body of water can provide an indication as to whether the water may be suitable to irrigate a type or kind of crop. Thus, in accordance with some aspects of the invention, some embodiments thereof relate to systems and techniques that can involve controlling one or more operating parameters based at least partially on a desired characteristic value that is at least partially derived from at least one requirement of a point of use. Where the point of use is, for example, a crop to be irrigated, the desired characteristic value can be based on the salt tolerance of the crop and/or one or more attributes or characteristics of the soil.

The sodium adsorption ratio value is typically determined according to the formula (1), $$SAR = \frac{[Na]}{\sqrt{[Ca] + [Mg]}}$$

where [Na] is the sodium species concentration, in mol/m$^3$, in the water, [Ca] is the calcium species concentration, in mol/m$^3$, in the water, and [Mg] is the magnesium species concentration, in mol/m$^3$, in the water. Other characteristic values of the water may be utilized, alone or in conjunction with the SAR value. Thus, in some cases, the characteristic value of the water that can serve as indication of water quality or suitability for its intended purpose involves the total dissolved solids concentration in the water, the pH, and/or the concentration of one or more toxic or hazardous species.

Adjusting the SAR value of the, for example, irrigation water, may be effected by adjusting one or more operating parameters of the water system. For example, the relative ratio of treated water from different treatment units having various associated SAR values may be adjusted to provide a composite or blended mixture of product water having the desired SAR value. Other techniques including reducing the flow rate of the water stream through the one or more separation apparatus or increasing the residence or treatment period can facilitate achieving the desired SAR value. In addition or in conjunction with such techniques, adjusting the applied potential or pressure level through, for example, the electrically-driven or pressure-driven separation apparatus can also facilitate providing treated water having the one or more desired characteristics.

Embodiments of systems of the invention may desalinate brackish or saline water to provide irrigation water that avoids or reduces the extent of any soil permeability and/or infiltration problems.

The one or more characteristic values of the treated water may be a relative correlation between species contained in the water. For example, the characteristic value may be a ratio of dissolved sodium species to dissolved calcium. A preferred desirable sodium to calcium ratio of not more than about 3:1 may avoid or reduce the likelihood of water infiltration problems due to soil dispersion and plugging and soil surface pore sealing. Further, some embodiments of the invention can selectively reduce the concentration of monovalent sodium in irrigation water, so that a source of relatively calcium-rich water can be provided to counteract any sodium-dispersing phenomena in irrigation.

The product water can have an SAR value in a range from about 2 to about 8. The target or desirable SAR value may, however, depend on one or more factors in the agricultural facility. For example, the target SAR value depend on the type of crops grown in the facility, the stage of growth of one or more crops in the facility, and the soil conditions including the water infiltration rate, sodicity, and/or alkalinity of the soil. Particular guidelines that may be used to provide one or more target characteristics of irrigation water include those provided by The Food and Agriculture Organization of the United Nations (FAO). For example, the exchangeable sodium level, which can be correlated to the SAR value, can serve as a desirable characteristic value of water utilized for irrigation purposes. In particular, sensitive crops such as, but not limited to fruits, nuts, and citrus typically require irrigation water having an SAR value of up to about 8; other sensitive crops such as beans may tolerate irrigation water having an SAR value of up to about 18; moderately tolerant crops such as clover, oats, and rice may tolerate irrigation water having an SAR value of up to about 18 to 46; and tolerant crops such as, but not limited to wheat, barley, tomato, beets, and tall wheat grass, may tolerate irrigation water having an SAR value of up to about 46 to 102. Embodiments of systems disclosed herein may include treatment units or combinations of same configured to produce irrigation water having SAR values in any of the ranges disclosed above as desired for a particular use.

Figure 5:
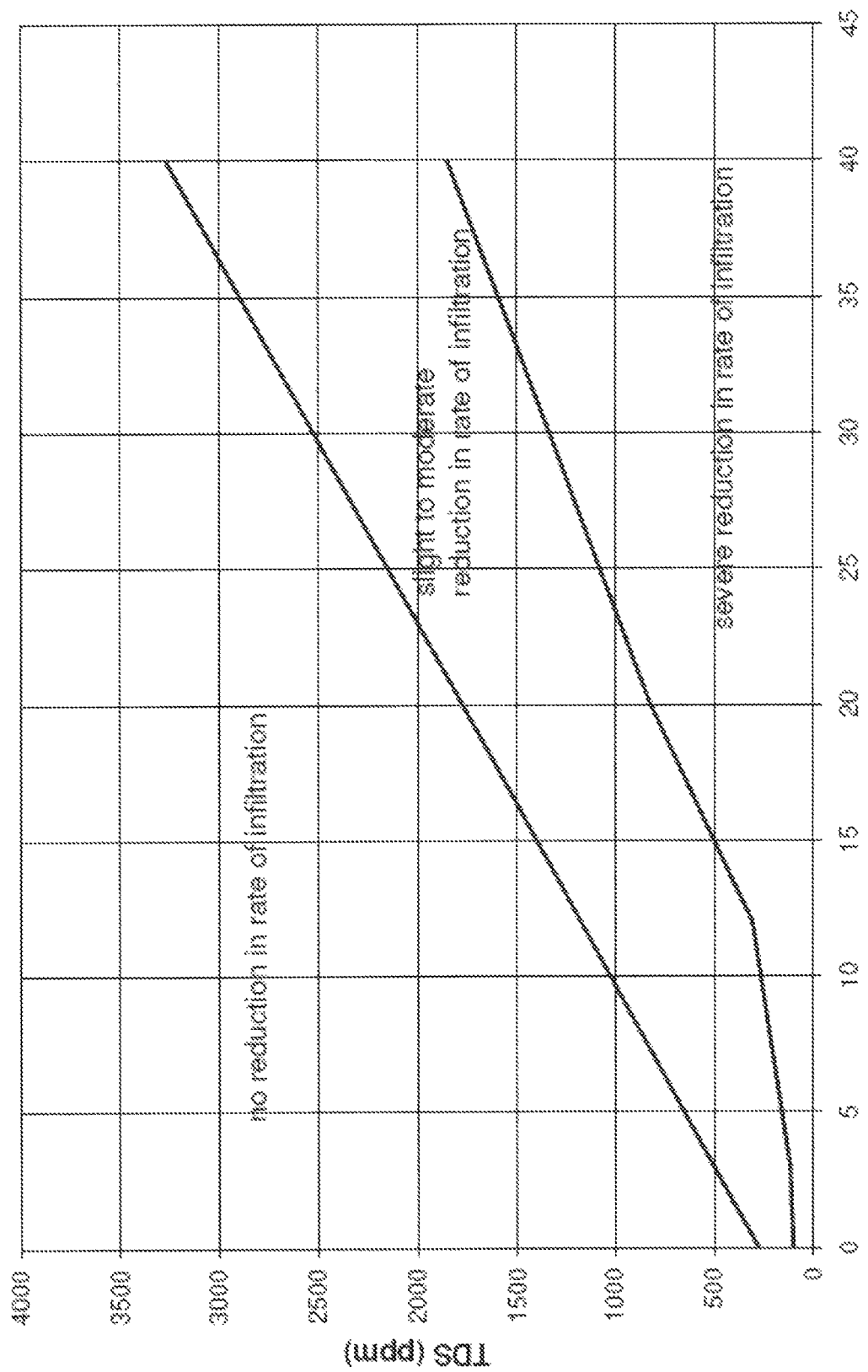
FIG. 5 is a graph showing representative ranges of acceptable levels of water characteristics in accordance with some aspects of the invention.

Infiltration issues typically arise when irrigation water does not enter the soil and becomes unavailable to crops. In contrast to salinity issues, which reduce the availability of water, infiltration problems can effectively reduce the quantity of water available for crop use. Water infiltration can increase with increasing salinity and can decrease with decreasing salinity or increasing sodium content relative to calcium and magnesium. Further, low salinity water having, for example, a conductivity of less than about 0.5 dS/m, is typically corrosive and tends to leach surface soil of soluble minerals and salts, such as calcium, which in turn can reduce soil aggregation and structure. Soil without or having low salt content tends to be dispersive as fine soil particles which fill pore spaces, effectively sealing the soil surface and reducing the rate of water infiltration. The soil would tend to form a crust which reduces the amount of water entering the subsurface and can also prevent crop emergence. Thus, in some embodiments of the invention, the desired water quality may be further based on the salinity of the irrigation water. For example, FIG. 5, which is based on a publication by Ayers, R. S. and Westcot, D. W., titled "Water Quality for Agriculture," FAO Irrigation and Drainage Paper 29 rev. 1, Food and Agriculture Organization of the United Nations, 1989, 1994, and which shows the influence of salinity, as represented by TDS concentration, and SAR on infiltration, can conjunctively provide desirable salinity levels and SAR values of irrigation water that reduces or avoids infiltration problems. In FIG. 5, seawater properties were used to derive TDS concentration values from electrical conductivity data from the above reference. In particular, the correlations between the density and salinity and between the salinity and electrical conductivity of seawater at 20° C. were determined based on published physical properties. These correlations were then used to convert the electrical conductivity values of seawater from the above-identified reference into the corresponding TDS concentration, which were then mapped relative to the corresponding SAR values to obtain the infiltration guidelines presented in FIG. 5.

Further embodiments of the invention may also provide suitable irrigation water when it has a composite characteristic value such as having an SAR value of less than about 8 while having a TDS level of about 1,500 ppm or more.

Some embodiments of the invention can provide desalination systems and techniques that selectively remove undesirable species which contrasts to non-selective desalination techniques such as those based on thermal and pressure-driven processes. Further, some systems and techniques of the invention can provide a product water stream without requiring the further addition of preferred species. For example, embodiments of the invention can provide irrigation water that does not involve further adjusting characteristic values by the addition of supplemental species.

Figure 3:
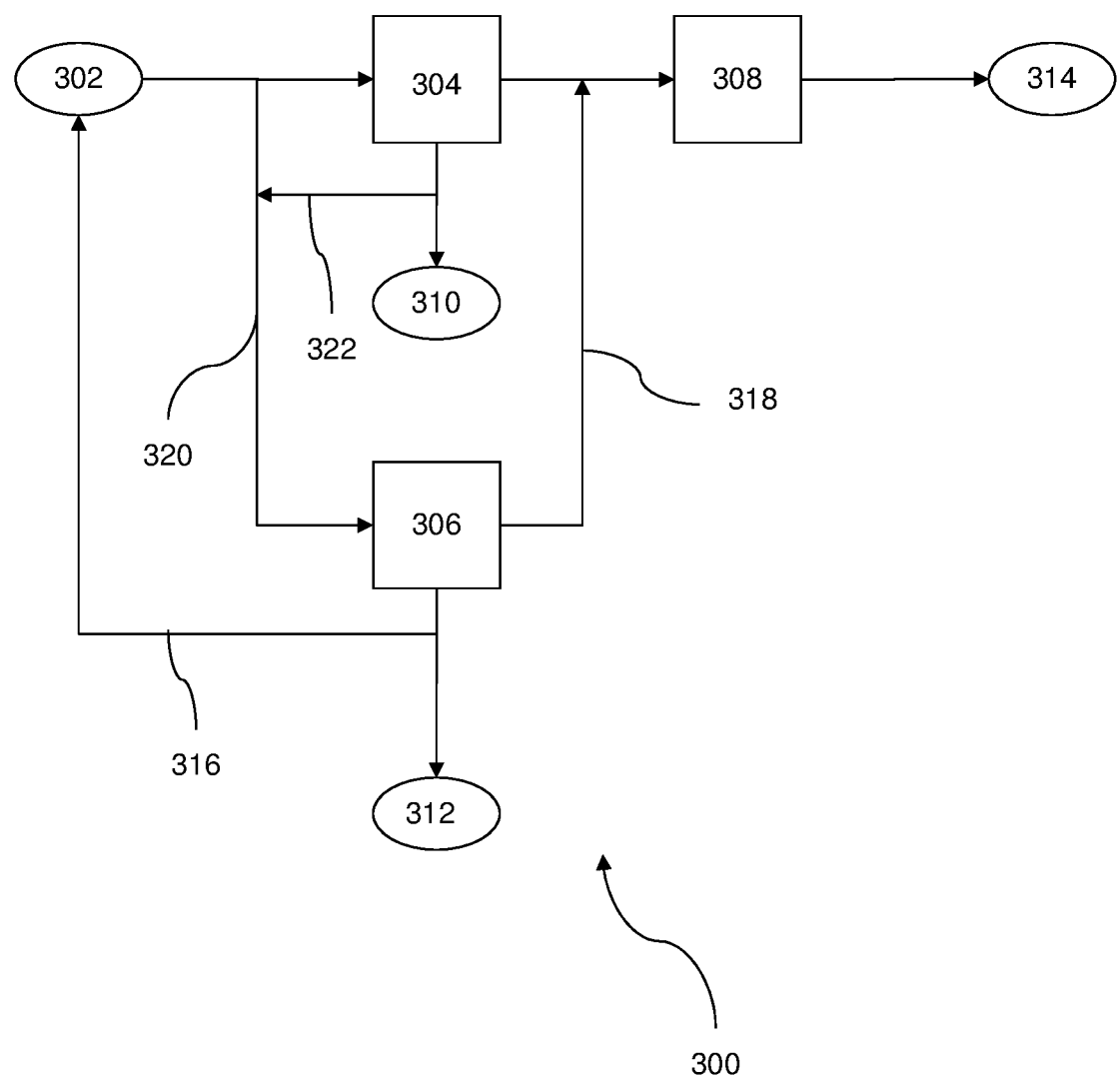
FIG. 3 is a schematic illustration of another system in accordance with further features of the invention.

Further features and aspects of the invention are illustrated in FIG. 3. The treatment system 300 exemplarily illustrated can comprise a first separation apparatus 304 and a second separation apparatus 306. Separation apparatus 304 and 306 typically treat a fluid from one or more sources 302. The water to be treated from source 302 typically contains a high or unacceptable level of dissolved species. The one or more separation apparatus can thus be utilized to at least partially remove or reduce the concentration of one or more undesirable species from the water. The water to be treated from source 302 may be supplied in parallel to both the first separation apparatus 304, and the second separation apparatus 306 through, for example, distribution system or conduit 320. As exemplarily illustrated, treated water from separation apparatus 304 can be combined with treated water from separation apparatus 306 delivered through, for example, distribution system or conduit 318, in one or more mixing operations or mixer 308 to provide a treated water stream having desired properties and/or characteristics to point of use 314. In accordance with some embodiments of the invention, the treated water may be rendered suitable to be used as potable and/or bathing water in one or more points of use 314.

First separation apparatus 304 may be an electrically-driven separation apparatus or a pressure-driven separation apparatus. Likewise, second separation apparatus 306 may be an electrically-driven separation apparatus or a pressure-driven separation apparatus. In accordance with some aspects of the invention, separation apparatus 304 removes at least a portion of a plurality of undesirable species in water to be treated from source 302. In some cases, first separation apparatus can indiscriminately remove at least a portion of a plurality of undesirable species from the water to be treated. For example, the first separation apparatus can utilize RO and/or NF based techniques to remove, typically without preference or selectivity, at least a portion of any undesirable species. The treated water stream resulting from the pressure-driven separation apparatus preferably exceeds potable water quality requirements.

The second separation apparatus can remove one or more undesirable species from the water stream to be treated. In some cases, the separation apparatus selectively removes at least a portion of one or more undesirable species from the water to produce a product water stream. If the product water stream from the second separation apparatus fails to meet or exceed potable water quality requirements, a portion of the treated water from the first separation apparatus that exceeds the potable water quality requirements may be incorporated or blended therewith. For example, where the first separation apparatus provides product water having a TDS level of about 250 mg/L and the second separation apparatus provides product water having a TDS level of about 1,000 mg/L, the product water streams can be combined in a volumetric ratio of about 2:1 to produce a blended product having a TDS level of about 500 mg/L. The target level may be a concentration that meets or exceeds one or more guidelines suggested by the World Health Organization for potable water in, for example, the WHO Guidelines for drinking-water quality, fourth edition, World Health Organization 2011. Other water streams may also be blended with one or more products streams of the separation apparatus of the invention to provide drinking and/or bathing water that meet or exceed guidelines or requirements typically set by government regulatory organizations.

One or more reject streams from the first separation apparatus, typically containing relative high levels of species removed from the first treated product stream may be discharged to drain, directed to one or more ancillary points of use 310, or returned to source 302. Further embodiments of the invention contemplate combining the reject water stream with water from source 302 through conduit 322 so as to be treated in the second separation apparatus. A secondary or reject water stream from second separation apparatus may also be discharged to a drain, directed to one or more ancillary points of use 310 and/or 312, returned to source 302 as shown through conduit 316.

Figure 4:
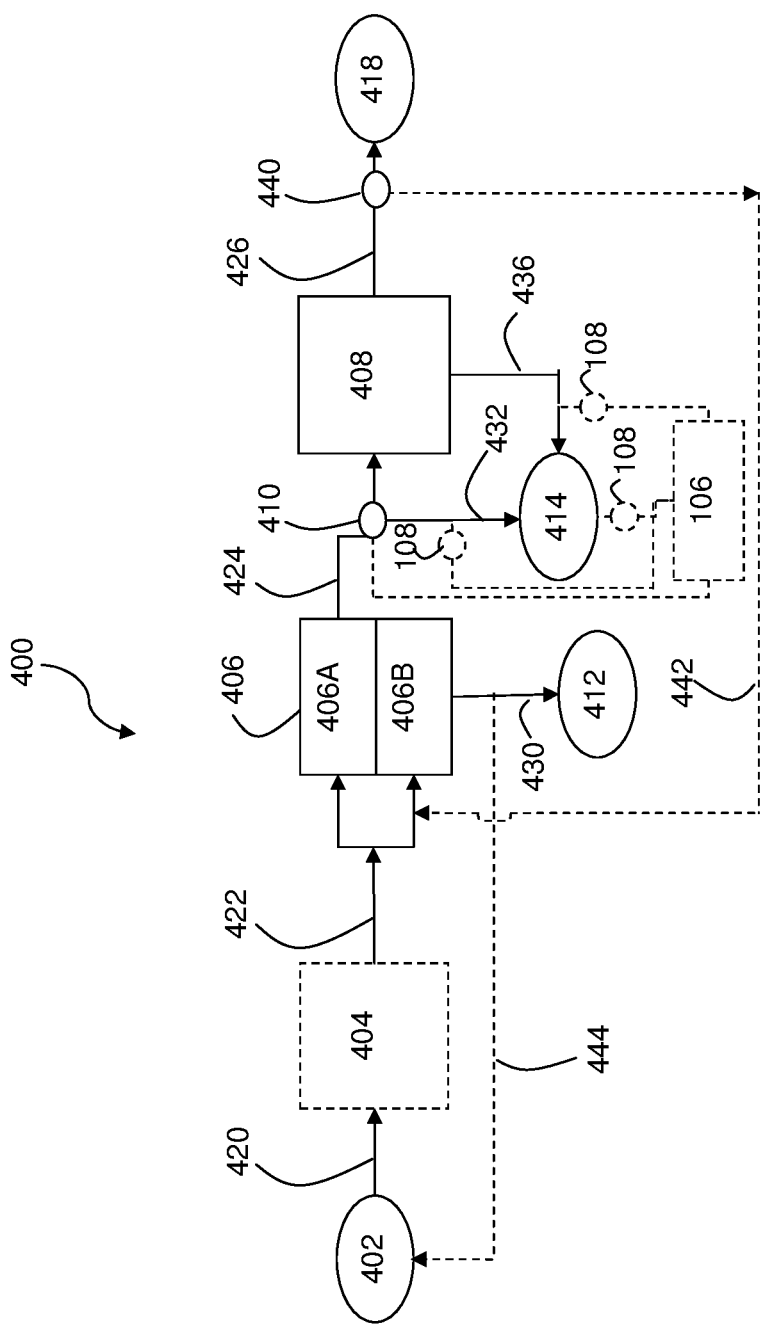
FIG. 4 is a schematic illustration of another system in accordance with further features of the invention.

In another embodiment, indicated generally at 400 in FIG. 4, a treatment system may include a source of water to be treated 402 which may include, for example, brackish water in fluid communication through a distribution system or conduit 420 to an optional pre-filtration system 404. The water to be treated may be brackish water having a TDS of between about 1,500 mg/L (1,500 ppm) and about 10,000 mg/L (10,000 ppm), and/or saline water containing high concentrations of dissolved solids or salts, for example, a concentration of dissolved salts of between about 500 mg/L and about 5,000 mg/L and one or more other contaminants, for example, about 40 ppm of nitrate, and undesirable levels of any one or more of boron, silica, bicarbonate, or selenate. The pre-filtration system 404 may be in fluid communication through a distribution system or conduit 422 to a first separation apparatus 406. Non-limiting examples of pre-treatment unit operations that may be utilized in pre-filtration system 404 which may reduce the concentration of at least one suspended solid entrained in the water to be treated include microfilters, settlers, screen filters, and coarse particle filters.

The first separation apparatus 406 may be an electrically-driven separation apparatus, for example, an electrodialysis apparatus. Distribution system or conduit 422 may split to provide water to be treated to diluting compartments 406A and concentrating compartments 406B of the first separation apparatus 406. The first separation apparatus 406 may include one or more monovalent ion selective membranes to selectively promote transfer of one or more monovalent cationic and/or anionic species. In some embodiments, the first separation apparatus 406 may comprise one or more monovalent cation selective membranes and one or more monovalent anion selective membranes, typically in one or more concentrating compartments of the apparatus.

Because the nature of electrodialysis is that power costs are inversely related to the level of salinity in water to be treated, high concentrations of ionic contaminants in the water to be treated may reduce power losses in the electrodialysis equipment (albeit at some expense of thermodynamic efficiency.)

The first separation apparatus 406 may remove a large fraction of contaminants from the water to be treated to produce a first diluent stream. The contaminants removed may include one or more ionic species. The first separation apparatus 406 may remove, for example, about 80% of sodium chloride and potassium chloride and also from about 50% to about 80% of the nitrate from the water to be treated supplied through distribution system or conduit 422. The first separation apparatus 406 may produce a diluate which may be high in divalent ions as compared to monovalent ions and may be acceptable for agricultural use without further treatment. In such instances, the energy use in the first separation apparatus is very low, since only a fraction of the monovalent ions and none of the divalent ions may be removed. To be suitable for agricultural use, the diluate from the first separation apparatus 406 may have a SAR value of, for example, less than about 20, less than about 18, less than about 10, less than about 5, less than about 3, or less than about 2, and may have a TDS value of less than about 3,500 ppm and/or greater than about 1,500 ppm.

A first portion of the diluate from the first separation apparatus 406 may be directed through a distribution system or conduit 424 and a distribution system or conduit 432 to a point of use 414 for agricultural use, for example, an irrigation water system or a holding system for irrigation water. A second portion of the diluate from the first separation apparatus 406 may be directed through the distribution system or conduit 424 to a second separation apparatus 408. The relative amounts of the diluate from the first separation apparatus 406 directed to point of use 414 and to the second separation apparatus 408 may be selected in any amount in a range of from about 0% to about 100% as desired. A diverting valve or other form of diverting system 410 may be utilized to vary the amount of diluate from the first separation apparatus 406 directed to point of use 414 and to the second separation apparatus 408 as desired. The diverting valve or system 410 may be operated by a controller 106. The controller 106 may receive an indication of one or more parameters of water from one or more of distribution systems or conduits 432 or 436 or from the point of use 414 from one or more sensors 108. The one or more parameters of water may include, for example, salinity, conductivity, pH, SAR value, TDS value, or any other parameter or parameters of interest. The controller 106 may adjust the diverting valve or system 410 and thus the ratio of diluate from the first separation apparatus 406 directed to point of use 414 and to the second separation apparatus 408 based on the indication of the one or more parameters of water from the sensor(s) 108. Controller 106 may also adjust one or more operating parameters of the first separation apparatus 406 based on the indication of the one or more parameters of water from the sensor(s) 108. The one or more operating parameters of the first separation apparatus 406 may include, for example, current, flow rate, or any other operating parameter or parameters.

Concentrate from the first separation apparatus 406 may be carried through a distribution system or conduit 430 as a waste stream which may be discharged to drain, directed to one or more ancillary points of use 412, for example, for use in the electrochemical production of chlorine, alkali, chlorine gas, hypochlorite ions, hydrochloric acid, or sulfuric acid, or returned to the source 402, through, for example, distribution system or conduit 444. The first separation apparatus 406 may operate at very high water recoveries, for example, between about 50% and about 95% or more because monovalent ions may be present in the concentrate delivered through distribution system or conduit 430 at high concentrations without precipitation.

The partially desalinated water output as the first diluate stream from the first separation apparatus 406 may remain unacceptably high in monovalent salts and/or high in divalent salts, for example, calcium sulfates and/or magnesium sulfates for some uses, such as for potable water. At least a portion of the first diluate stream may thus be further treated in a second separation apparatus 408. The second separation apparatus 408 may be a pressure-driven separation apparatus, for example, a membrane filtration system. The second separation apparatus 408 may include nanofiltration membranes or reverse osmosis membranes. The second separation apparatus 408 may be a low-pressure nanofiltration system or a nanofiltration system operated at a low pressure, and thus with low energy use, for example, with a transmembrane pressure of less than about 4 bar. The second separation apparatus 408 may treat water provided through the distribution system or conduit 424 to produce a permeate and a retentate. The second separation apparatus 408 may remove a large fraction, for example, between about 20% and about 95% of remaining monovalent ions from the influent diluate from the first separation apparatus 406 and produce a permeate stream with a very low concentration, for example, less than about 500 mg/L (500 ppm) of monovalent ionic contaminants. The second separation apparatus 408 may also remove additional undesirable components from the portion of the diluate from the first treatment apparatus, for example, an additional 20% to 90% of nitrates from the portion of the diluate from the first separation apparatus 506. Retentate from the second separation apparatus 408 may have an SAR value comparable or even lower than the diluate and can therefore be directed through distribution system or conduit 436 to point of use 414 where it may be combined with the first portion of the diluate from the first separation apparatus 406 for agricultural use. Point of use 414 may include a mixer (not shown) configured to blend diluate produced in the electrodialysis apparatus 406 with any retentate produced in the nanofiltration apparatus 408 and produce irrigation water having a SAR value intermediate or even lower of a SAR value of the diluate and a SAR value of the retentate.

Permeate from the second separation apparatus 408 may be low in divalent ionic contaminants and/or particulates and/or microbial contaminants. Permeate from the second separation apparatus 408 may be suitable for potable use, and may have characteristics defined in recognizable standards, for example, those provided by the WHO. The filtrate from the second separation apparatus 408 may include, for example, a TDS level of less than about 500 ppm, low amounts of divalent ions, low amount of metals and trace elements, low levels of nitrates, for example, less than about 10 ppm of nitrates, low levels of particulates and/or colloidal or microbiological impurities, and/or a low turbidity or organic content. The characteristics of the filtrate from the second separation apparatus 408 may meet regulatory requirements for potable water in a jurisdiction in which the system 400 is operated. Filtrate from the second separation apparatus 408 may be directed through a distribution system or conduit 426 to a point of use 418 for use as potable water.

In some embodiments a portion of the filtrate from the second separation apparatus 408 may be directed through a distribution system or conduit 442 to be used as concentrate makeup for the first separation apparatus 406. The amount or fraction of filtrate from the second separation apparatus 408 utilized as concentrate makeup for the first separation apparatus 406 may be selected as desired in relation to the water recovery desired from the concentrate outlet. The amount or fraction of filtrate from the second separation apparatus 408 used as concentrate makeup for the first separation apparatus 406 may be selected based on, for example, the quality of the filtrate from the second separation apparatus 408 and the need for the concentrate makeup. A valve or other diverting system 440 may provide for the amount of filtrate from the second separation apparatus 408 utilized as concentrate makeup for the first separation apparatus 406 to be adjusted as desired. Valve or diverting system 440 may be operated by the controller 106 responsive to information from any of sensors 108 or other sensors located in various portions of the system. The amount of the permeate from the second separation apparatus 408 used as concentrate makeup for the first separation apparatus 406 may be selected based on, for example, the quality of the permeate from the second separation apparatus 408 and/or the need for the concentrate makeup.

The first separation apparatus 406 may include one or more monovalent ion selective membranes to selectively promote transfer of one or more monovalent cationic or anionic species. In other embodiments, the water treated in the first separation apparatus 406 may be sufficiently low in monovalent ions that monovalent ion selective membranes would not be required in the first separation apparatus 406. The first separation apparatus 406 may thus utilize standard electrodialysis membranes known in the art. These standard electrodialysis membranes may be not monovalent ion selective.

The system illustrated in FIG. 4 has advantages over many alternate approaches to producing irrigation water and/or potable water from brackish water. As compared to conventional electrodialysis systems including monovalent selective membranes, the system illustrated in FIG. 4 may operate with a higher recovery, may require less salt removal in the electrically-driven separation apparatus than conventional electrodialysis systems, and may exhibit less loss of calcium than conventional electrodialysis systems. The electrically-driven separation apparatus of the system illustrated in FIG. 4 may thus be smaller and may consume less power than conventional electrodialysis systems for producing irrigation water and/or potable water from brackish water.

The system illustrated in FIG. 4 provides for a controllable ratio of irrigation water to potable water produced from influent water to be treated. The system produces waste that is low in species such as calcium, magnesium, boron, silica, selenium and nitrate. The majority of calcium, magnesium, silica, and nitrate in water to be treated introduced into the system is included in the irrigation water produced by the system. The system may utilize a nanofiltration filter as the pressure-driven separation apparatus rather than a more expensive reverse osmosis system to produce potable water suitable for use as drinking water. The system illustrated in FIG. 4 can produce irrigation water with a lower SAR value than conventional electrodialysis systems alone.

In the system illustrated in FIG. 4, one can operate at high or very low water recovery without loss of water because all the retentate can be used as agricultural water. For example, if one wishes to have very low recovery in the nanofilter to have minimum pressure differential due to osmotic pressure, to maximize the percentage rejection of salts, or to ensure that there is no scaling or fouling of the nanofilter during use, one can use a high fraction of the electrodialysis system diluate to the nanofilter, operate at very low recovery, and send all the retentate for use in irrigation. Thus this process enables operation for potable water at a very safe and low energy operating condition without loss of the use of any of the water feeding the nanofilter.

In implementations where the influent water contains acceptable levels of boron and selenium, the system can be designed and operated such that any non-hazardous traces in the influent are not significantly concentrated in the waste as in traditional purification methods. By not being unnecessarily concentrated, the concentrate effluent is less hazardous than for traditional water purification technologies. Further the electrodialysis system and/or the nanofiltration system can be operated at a pH such that boron and silica are not concentrated. Further the nanofiltration membrane can be chosen with removals of either moderate or insignificant boron or silica or nitrate removal and yet regardless may also remove selenium with its property of nearly complete removal of divalents. Thus these compounds may either be removed to desired levels for potability, for irrigation (where for example high nitrates are not problematic to return to the soil and thus are not problematic if the retentate is mixed with the electrodialysis diluate) or for both and by limiting their removal they do are not added to the concentrate effluent unless needed to be removed for one application or the other. A further result of operation with the systems and methods disclosed herein, so as to not to be prone to precipitation and scaling in the equipment, is to operate the system so as to not remove significant amounts of silica, calcium, magnesium, or sulfate in the electrodialysis device and thus enable much higher water recoveries with the disclosed system and method than with traditional methods. Further the system provides great flexibility in water purities (optimized for any application) and quantities and operates at higher water recoveries, and with lower pressure and with lower energy requirements that other purification technologies or methods.

In each of the systems described above, total water recoveries of between about 66% and about 95% or higher may be possible with low processing costs and high energy efficiency, for example, an energy efficiency of about 2.0 kwh/m$^3$ of purified water or less. In some embodiments none of the water purified to a level suitable for agricultural or potable use would need to be used for wastewater makeup. Rather, makeup water for the concentrate or diluate streams for the electrodialysis systems could be made up from downstream electrodialysis concentrate streams. The provision of this makeup water from these downstream sources may improve the overall electrical efficiency of the disclosed system as compared to systems not including the provision of makeup water as described.

Potable water produced in the above systems may be low in salinity and substantially or completely free of particulates, colloids, dissolved organic compounds, or microbes. The potable water may have characteristics defined in recognizable standards, for example, those provided by the WHO or EPA. The fraction of purified water produced that is suitable for agricultural use may include high levels of divalent ions and minerals, but have very low concentrations of impurities such as sodium chloride or potassium chloride. The fraction of purified water produced that is suitable for agricultural use may not require processing by softening membranes. Since only a small fraction of the total water influent to the treatment systems described above may be processed by nanofiltration type water softening membranes to produce potable water, the size and capital and operational costs of the water softening membrane units may be low relative to other systems where a greater quantity of water would need to be processed through water softening membrane units. Also, in some embodiments, only a small portion of the influent water to be treated would be processed through electrodialysis units or alternatively only a small fraction of salt removal including monovalent ion selective membranes, providing further for reduced treatment unit sizes and reduced capital and operational costs.

In some embodiments transport of divalent ions through electrodialysis units including monovalent ion selective membranes may be substantially avoided or eliminated. This may result in a reduced buildup of scale in the electrodialysis units and may reduce pH shifts and high voltages caused by sulfate transport through a typical anion electrodialysis membrane or other demineralization techniques.

Each of the embodiments of treatment systems described above may be used partially within a total system such that combinations of the various embodiments can be used for customized agricultural and potable water production quantities or qualities, depending on the feed water makeup and demand for the water for agricultural or potable uses. The quantities of water suitable for potable or agricultural consumption may be changed based on demand by running more or less water to be treated through each of the various embodiments, changing the relative water recoveries or adjusting based on salinity changes in the water to be treated.

As noted above, ancillary systems may be utilized in the systems and techniques of the invention in post-treatment operations. For example, one or more disinfecting systems such as those that irradiate, oxidize, or otherwise reduce microbiological activity in the water may be disposed to further treat the water. In implementations with high boron influent levels, residual boron may be removed using post treatment using boron selective ion exchange. The degree of boron removal post-treatment can selected as high or low depending on the influent boron level, the boron sensitivity of the particular crops being grown, the boron removal capability of the chosen nanofiltration membrane, and the pH adjustment chosen for the operation of the electrodialysis and/or the nanofiltration system. Thus not all the water need be treated for boron, depending on the use or combination of uses for the effluent water. Further, one or more storage systems may be also used as discussed above.

Because some embodiments of the invention can selectively remove monovalent species, any resultant secondary or concentrate streams would be less susceptible to scaling and fouling. This feature advantageously allows some separation embodiments of the invention to operate at higher water recovery rates, compared to non-selective techniques, because the volumetric rate of any secondary streams can be effectively reduced without or with less concern for undesirable precipitation. Thus, some embodiments of the invention directed to utilizing systems and techniques that selectively separate monovalent species can be operated at higher recovery rates compared to non-selective ED and distillation based separation apparatus, and even much higher recovery rates compared RO and NF based separation apparatus. Significantly, because RO and NF based separation systems selectively reduce the concentration of non-monovalent species, these processes cannot effectively provide treated water having low SAR values.

A further advantage of the selective separation systems and techniques of the invention pertains to the reduction or removal of non-ionized species that have little or no influence on crop growth. For example, silica is typically not preferentially removed in the ED-based systems of the invention thereby avoiding any scaling or fouling concerns in secondary streams that typically arise when treating silica-containing water in RO and distillation apparatus. In addition, because secondary streams of some embodiments of the invention typically have reduced scaling tendencies, the recovery rates in the separation systems and techniques of the invention may be greater than the recovery rates of RO and distillation based systems.

Controller 106 of the systems of the invention may be implemented using one or more computer systems. The computer system may be, for example, a general-purpose computer. The computer system may be implemented using specially-programmed, special-purpose hardware, for example, an application-specific integrated circuit (ASIC) or controllers intended for water treatment system.

The computer system can include one or more processors typically connected to one or more memory devices, which can comprise, for example, any one or more of a disk drive memory, a flash memory device, a RAM memory device, or other device for storing data. The memory component or subsystem is typically used for storing programs and data during operation of the system 100 and/or the computer system. For example, the memory component may be used for storing historical data relating to the parameters over a period of time, as well as operating data. Software, including programming code that implements embodiments of the invention, can be stored on a computer readable and/or writeable nonvolatile recording medium, and then typically copied into the memory subsystem wherein it can then be executed by one or more processors. Such programming code may be written in any of a plurality of programming languages, for example, Java, Visual Basic, C, C #, or C++, Pascal, Eiffel, Basic, or any of a variety of combinations thereof.

Components of the computer system may be coupled by an interconnection mechanism, which may include one or more busses that provide communication between components that are integrated within a same device and/or a network that provide communication or interaction between components that reside on separate discrete devices. The interconnection mechanism typically enables communications, including but not limited to data and instructions to be exchanged between components of the system.

The computer system can also include one or more input devices, for example, a keyboard, mouse, trackball, microphone, touch screen, and one or more output devices, for example, a printing device, display screen, or speaker. In addition, computer system may contain one or more interfaces that can connect the computer system to a communication network, in addition or as an alternative to the network that may be formed by one or more of the components of the system.

According to one or more embodiments of the invention, the one or more input devices may include sensors for measuring parameters. Alternatively, the sensors, the metering valves and/or pumps, or all of these components may be connected to a communication network that is operatively coupled to the computer system. For example, one or more sensors 108 may be configured as input devices that are directly connected to controller 106, metering valves, pumps, and/or components of apparatus 102 may be configured as output devices that are connected to controller 108. Any one or more of such subcomponents or subsystems may be coupled to another computer system or component so as to communicate with the computer system over a communication network. Such a configuration permits one sensor to be located at a significant distance from another sensor or allow any sensor to be located at a significant distance from any subsystem and/or the controller, while still providing data therebetween.

The controller can include one or more computer storage media such as readable and/or writeable nonvolatile recording medium in which signals can be stored that define a program to be executed by the one or more processors. The medium may, for example, be a disk or flash memory. In typical operation, the processor can cause data, such as code that implements one or more embodiments of the invention, to be read from the storage medium into a memory that allows for faster access to the information by the one or more processors than does medium. The memory is typically a volatile, random access memory such as a dynamic random access memory (DRAM) or static memory (SRAM) or other suitable devices that facilitates information transfer to and from the one or more processors.

Although the control system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 106 can be performed in separate computers, which in turn, can be communication through one or more networks.

Although various embodiments exemplarily shown have been described as using sensors, it should be appreciated that the invention is not so limited. The invention contemplates the modification of existing facilities to retrofit one or more systems, subsystems, or components and implement the techniques of the invention. Thus, for example, an existing facility, especially an agricultural or crop-growing facility, can be modified to include one or more systems configured to provide irrigation water, potable water, or both, accordance with any one or more embodiments exemplarily discussed herein. Alternatively, existing systems and/or components or subsystems thereof can be modified to perform any one or more acts of the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Use of ordinal terms such as "first," "second," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Further the use of the term "potable" with reference to water, especially treated water, does not limit the scope of the inventive subject matter and can refer to water suitable for livestock use, including consumption.

What is claimed is:

1. A method of treating brackish water to produce irrigation water, the method comprising:
    directing water to be treated having a concentration of dissolved salts of between 500 mg/L and 5,000 mg/L to an inlet of an electrodialysis apparatus including one or more monovalent ion selective membranes;
    treating the water to be treated in the electrodialysis apparatus to produce a diluate;
    directing a first amount of the diluate to an irrigation distribution system and a second amount of the diluate to an inlet of a nanofiltration apparatus;
    treating the diluate directed to the inlet of the nanofiltration apparatus in the nanofiltration apparatus to produce a permeate and a retentate; and
    combining the retentate with the first amount of the diluate directed to the irrigation distribution system at the irrigation distribution system.

2. The method of claim 1, further comprising directing at least a portion of the permeate produced in the nanofiltration apparatus to a concentrating compartment of the electrodialysis apparatus.

3. The method of claim 1, wherein producing the diluate in the electrodialysis apparatus comprises producing treated water having a SAR value of less than about 10.

4. The method of claim 3, wherein producing the diluate in the electrodialysis apparatus comprises producing treated water having a SAR value of less than about 5.

5. The method of claim 1, wherein producing the retentate in the nanofiltration apparatus comprises producing treated water having a SAR value of less than the SAR value of the diluate.

6. The method of claim 1, wherein combining the retentate with the first amount of the diluate directed to the irrigation distribution system comprises producing irrigation water with a SAR value intermediate of a SAR value of the diluate and a SAR value of the retentate.

7. The method of claim 6, wherein combining the retentate with the first amount of the diluate directed to the irrigation distribution system comprises producing irrigation water with a SAR value of less than about 8 and a total dissolved solids level of greater than about 1,500 ppm.

8. The method of claim 1, further comprising directing the first amount of the diluate from the electrodialysis apparatus to the irrigation distribution system and directing the second amount of the diluate from electrodialysis apparatus to the nanofiltration apparatus based on one or more parameters of one of the diluate from the electrodialysis apparatus and the retentate from the nanofiltration apparatus.

9. The method of claim 1, further comprising adjusting one or more operating parameters of the electrodialysis apparatus based on one or more parameters of one of the diluate from the electrodialysis apparatus and the retentate from the nanofiltration apparatus.

10. The method of claim 1, further comprising removing suspended solids from the water to be treated by pre-filtering the water to be treated prior to directing the water to be treated to the inlet of the electrodialysis apparatus.

11. The method of claim 1, further comprising directing permeate comprising a total dissolved solids content of less than about 500 ppm, from the permeate outlet of the nanofiltration apparatus to a potable water point of use.

12. The method of claim 1, further comprising varying an amount of permeate produced in the nanofiltration apparatus directed to the electrodialysis apparatus as concentrate makeup utilizing a diverting system including a valve and a conduit providing direct fluidic communication between the valve and an inlet of a concentrating compartment of the electrodialysis apparatus.

* * * * *